United States Patent
Kim et al.

(10) Patent No.: US 11,615,742 B2
(45) Date of Patent: *Mar. 28, 2023

(54) DISPLAY DEVICE INCLUDING AN ADHESIVE MEMBER OVERLAPPED BY A SENSOR UNIT AND ANOTHER ADHESIVE MEMBER AND METHOD FOR MANUFACTURING THE SAME

(71) Applicant: Samsung Display Co., Ltd., Yongin-Si (KR)

(72) Inventors: Sohyun Kim, Cheonan-si (KR); Muhyun Kim, Seoul (KR); Yanghan Son, Cheonan-si (KR); Kyungsu Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/475,738

(22) Filed: Sep. 15, 2021

(65) Prior Publication Data

US 2022/0005410 A1   Jan. 6, 2022

Related U.S. Application Data

(63) Continuation of application No. 16/376,388, filed on Apr. 5, 2019, now Pat. No. 11,132,945.

(30) Foreign Application Priority Data

Jun. 8, 2018   (KR) .......................... 10-2018-0066335

(51) Int. Cl.
*G09G 3/3225* (2016.01)
*G06V 40/13* (2022.01)

(52) U.S. Cl.
CPC .......... *G09G 3/3225* (2013.01); *G06V 40/13* (2022.01); *G09G 2300/0809* (2013.01); *G09G 2320/041* (2013.01)

(58) Field of Classification Search
None
See application file for complete search history.

(56) References Cited

U.S. PATENT DOCUMENTS

| 5,335,305 A | 8/1994 | Kosa et al. |
| 6,791,660 B1 | 9/2004 | Hayashi et al. |
| 9,399,239 B2 | 7/2016 | Lim et al. |

(Continued)

FOREIGN PATENT DOCUMENTS

| JP | 2010256560 A | 11/2010 |
| JP | 2017145096 A | 8/2017 |

(Continued)

OTHER PUBLICATIONS

Extended European Search Report for Application No. 19179021.1-1221 dated Oct. 9, 2019.

*Primary Examiner* — Kirk W Hermann
(74) *Attorney, Agent, or Firm* — Cantor Colburn LLP

(57) ABSTRACT

A display device includes a display module, a first adhesive member including a thermal initiator and directly disposed on a rear surface of the display module, a sensor unit directly disposed on the first adhesive member, and a second adhesive member including a photoinitiator and directly disposed on at least a portion of the first adhesive member and the rear surface of the display module.

20 Claims, 21 Drawing Sheets

(56) References Cited

U.S. PATENT DOCUMENTS

| | | | |
|---|---|---|---|
| 9,639,224 B2 | 5/2017 | Lee et al. | |
| 10,741,621 B2 | 8/2020 | Choo et al. | |
| 2013/0021289 A1 | 1/2013 | Chen et al. | |
| 2014/0028582 A1 | 1/2014 | Choi | |
| 2014/0168544 A1 | 6/2014 | Niimi | |
| 2015/0004345 A1 | 1/2015 | Chaung et al. | |
| 2015/0371076 A1* | 12/2015 | Lee | G06V 40/13 382/124 |
| 2016/0109908 A1* | 4/2016 | Siddiqui | G06F 1/1652 16/225 |
| 2016/0315276 A1 | 10/2016 | Seol et al. | |
| 2017/0061193 A1 | 3/2017 | Young et al. | |
| 2017/0270335 A1 | 9/2017 | Evans, V et al. | |
| 2017/0300736 A1* | 10/2017 | Song | G06V 40/1312 |
| 2017/0323144 A1* | 11/2017 | Wu | B32B 7/12 |
| 2017/0344788 A1* | 11/2017 | Lee | G06F 3/0412 |
| 2018/0012057 A1 | 1/2018 | Cho et al. | |
| 2018/0068159 A1 | 3/2018 | Benkley, III et al. | |
| 2018/0151641 A1* | 5/2018 | Choo | H04M 1/0266 |
| 2018/0365472 A1* | 12/2018 | Cai | H04M 1/026 |
| 2019/0073505 A1* | 3/2019 | Kwon | H01L 27/323 |
| 2019/0087630 A1* | 3/2019 | Seo | G06V 40/40 |
| 2019/0147214 A1* | 5/2019 | Lee | H01L 51/0097 382/124 |
| 2019/0205593 A1* | 7/2019 | Kim | H01L 27/3234 |
| 2019/0205603 A1 | 7/2019 | Lee et al. | |

FOREIGN PATENT DOCUMENTS

| | | | |
|---|---|---|---|
| JP | 2018085114 A | 5/2018 | |
| KR | 1020150031820 A | 3/2015 | |
| KR | 101721929 B1 | 3/2017 | |
| KR | 1020180005994 A | 1/2018 | |
| KR | 1020180011547 A | 2/2018 | |
| KR | 1020180011553 A | 2/2018 | |
| TW | 201807858 A | 3/2018 | |
| WO | 2013011811 A1 | 1/2013 | |
| WO | 2015159957 A1 | 10/2015 | |
| WO | 2017127469 A1 | 7/2017 | |
| WO | WO-2017127469 A1 * | 7/2017 | C08G 18/69 |

\* cited by examiner

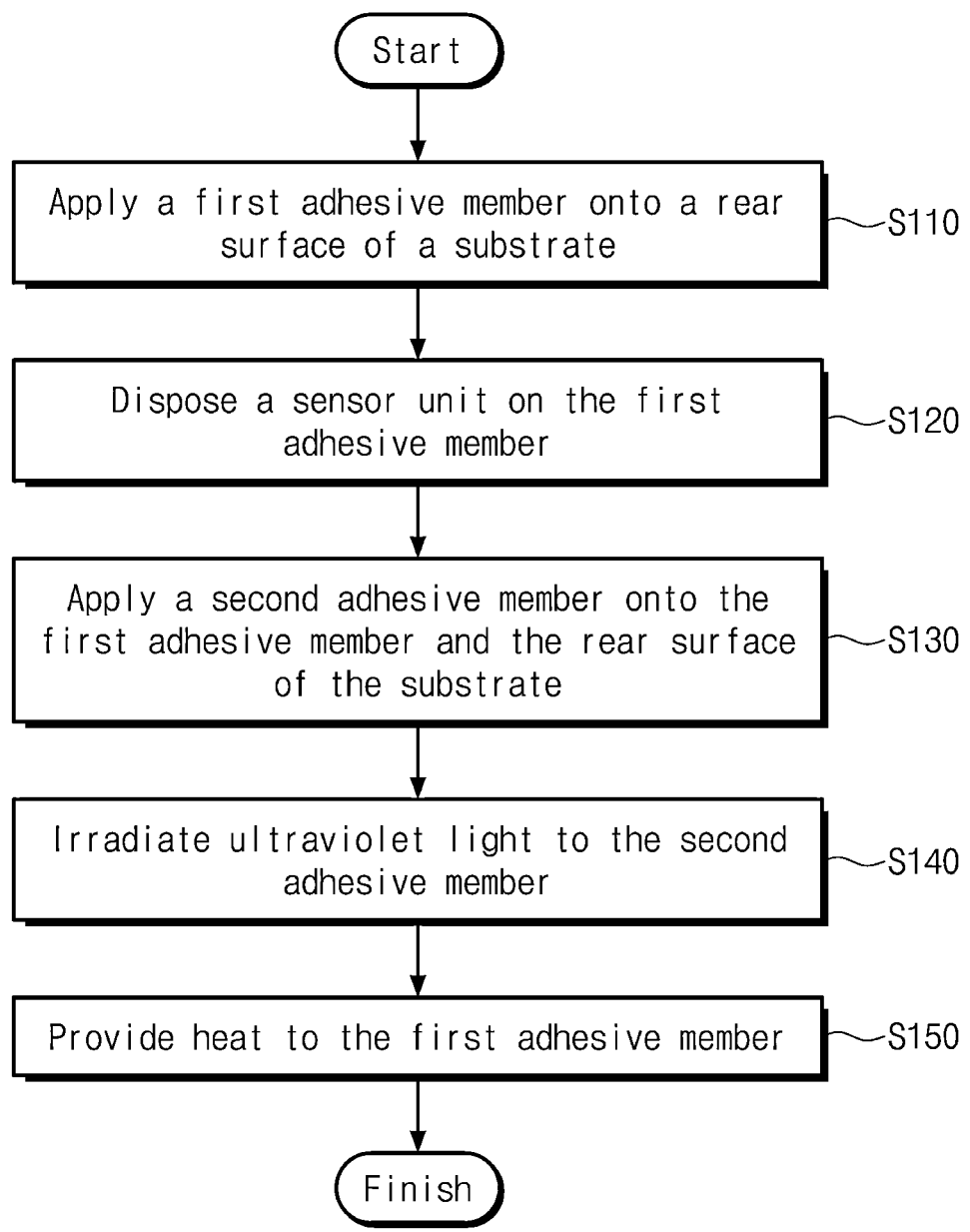

FIG. 13B
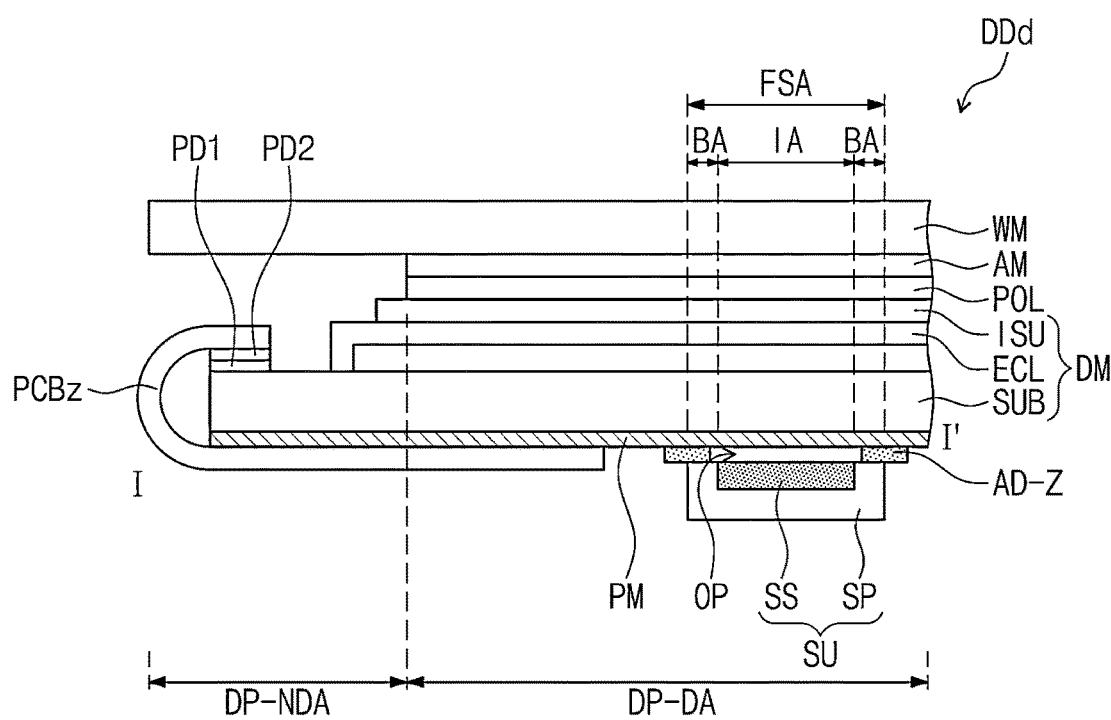
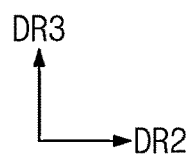

DISPLAY DEVICE INCLUDING AN ADHESIVE MEMBER OVERLAPPED BY A SENSOR UNIT AND ANOTHER ADHESIVE MEMBER AND METHOD FOR MANUFACTURING THE SAME

This application is a continuation of U.S. patent application Ser. No. 16/376,388, filed on Apr. 5, 2019, which claims priority to Korean Patent Application No. 10-2018-0066335, filed on Jun. 8, 2018, and all the benefits accruing therefrom under 35 U.S.C. § 119, the content of which in its entirety is herein incorporated by reference.

BACKGROUND

1. Field

Exemplary embodiments of the invention herein relate to a display device, and more particularly, to a display device and a method for manufacturing the same.

2. Description of the Related Art

Various display devices used in multimedia devices such as televisions, portable phones, tablet computers, navigation systems, and game consoles have been developed.

The various display devices may generally include a display panel which displays an image, and an input sensing unit which senses an external input. The display panel may include a display area in which an image is displayed, and a bezel area which is disposed around the display area. Recently, a display device for reducing the bezel area and for enlarging the display area has been developed. In this case, since the bezel area of the display device is reduced, driving components previously disposed in the bezel area may overlap the display area. A fingerprint recognition sensor, for example, overlapping the display area has been developed.

The fingerprint recognition sensor may be adhered to a rear surface of the display panel by an adhesive member. The adhesive member may be hardened depending on a change in temperature by external heat provided from the outside. The adhesive member may firmly fix the fingerprint recognition sensor to the display panel by the external heat.

SUMMARY

To provide an external heat to an adhesive member, a display device may be moved into a chamber for providing heat. However, the adhesive member and a display panel may move relative to each other when the display device is moved. Thus, a fingerprint recognition sensor may be misaligned with a sensing area in which a fingerprint is recognized.

The invention may provide a display device capable of easily aligning a sensor unit with a sensing area, and a method for manufacturing the same.

In an exemplary embodiment of the invention, a display device includes a display module, a first adhesive member including a first thermal initiator and directly disposed on a rear surface of the display module, a sensor unit directly disposed on the first adhesive member, and a second adhesive member including a first photoinitiator and directly disposed on at least a portion of the first adhesive member and the rear surface of the display module.

In an exemplary embodiment, the first thermal initiator may be activated by a change in temperature, and the first photoinitiator may be activated by ultraviolet ("UV") light.

In an exemplary embodiment, the display module may include a display area in which an image is displayed, and a bezel area adjacent to the display area. The sensor unit may overlap the display area.

In an exemplary embodiment, an opening overlapping the sensor unit may be defined in the first adhesive member, and the sensor unit may be surrounded by the first adhesive member in a plan view.

In an exemplary embodiment, the sensor unit may be spaced apart from the rear surface of the display module by the first adhesive member.

In an exemplary embodiment, the sensor unit may include a sensor overlapping the opening, and a package in which the sensor is disposed (e.g., mounted). The package may be directly disposed on the first adhesive member.

In an exemplary embodiment, the sensor unit may include an optical type fingerprint recognition sensor.

In an exemplary embodiment, the first adhesive member may overlap an entirety of the sensor unit and may be directly disposed on the rear surface of the display module and the sensor unit.

In an exemplary embodiment, the sensor unit may include an ultrasonic type fingerprint recognition sensor.

In an exemplary embodiment, the first adhesive member and the second adhesive member may constitute a single unitary body on the rear surface of the display module. The first adhesive member may further include a second photoinitiator, and the second adhesive member may further include a second thermal initiator.

In an exemplary embodiment, the display device may further include a circuit board electrically connected to the display module and disposed on the rear surface of the display module. A hole area may be defined in the circuit board, and the sensor unit may be inserted in the hole area and may be directly disposed on the first adhesive member.

In an exemplary embodiment, the display module may include a substrate, a display element layer disposed on the substrate, an encapsulation member disposed on the display element layer, and an input sensing unit disposed on the encapsulation member. The first adhesive member and the second adhesive member may be disposed on a rear surface of the substrate, which corresponds to the rear surface of the display module.

In an exemplary embodiment of the invention, a display device includes a display module including a display area in which an image is displayed, and a bezel area adjacent to the display area, a protective member overlapping a portion of the display area and disposed on a rear surface of the display module, a sensor unit overlapping the portion of the display and disposed on the protective member, and an adhesive member overlapping the sensor unit and adhering the sensor unit to the protective member.

In an exemplary embodiment, a folding area and a non-folding area adjacent to the folding area may be defined in the display module, and the non-folding area may overlap the sensor unit. The protective member may overlap the non-folding area.

In an exemplary embodiment of the invention, a method for manufacturing a display device includes applying a first adhesive member onto a rear surface of a substrate in which a display area and a bezel area adjacent to the display area are defined, disposing a sensor unit on the first adhesive member, applying a second adhesive member onto at least a portion of the first adhesive member and the rear surface of the substrate, irradiating UV light to the second adhesive member, and providing external heat to the first adhesive member.

In an exemplary embodiment, the first adhesive member may include a thermal initiator and may be applied onto the rear surface of the substrate by a first applying apparatus to overlap the display area. The second adhesive member may include a photoinitiator and is applied onto the rear surface of the substrate by a second applying apparatus to overlap the display area.

In an exemplary embodiment, the first adhesive member and the second adhesive member may be applied onto the rear surface of the substrate by one applying apparatus, and the first adhesive member may include a first thermal initiator and a first photoinitiator and the second adhesive member may include a second thermal initiator and a second photoinitiator.

In an exemplary embodiment, the applying of the second adhesive member and the irradiating of the UV light may be performed at a same time.

In an exemplary embodiment, the first adhesive member may be applied such that an entirety of the sensor unit overlaps the first adhesive member.

In an exemplary embodiment, the first adhesive member may be applied such that the sensor unit is surrounded by the first adhesive member in a plan view.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain principles of the invention. In the drawings:

FIG. 8 is a flowchart illustrating an exemplary embodiment of a method for manufacturing a display device, according to the invention;

FIG. 13B is a cross-sectional view illustrating the display device of FIG. 13A.

DETAILED DESCRIPTION

Figure 1:
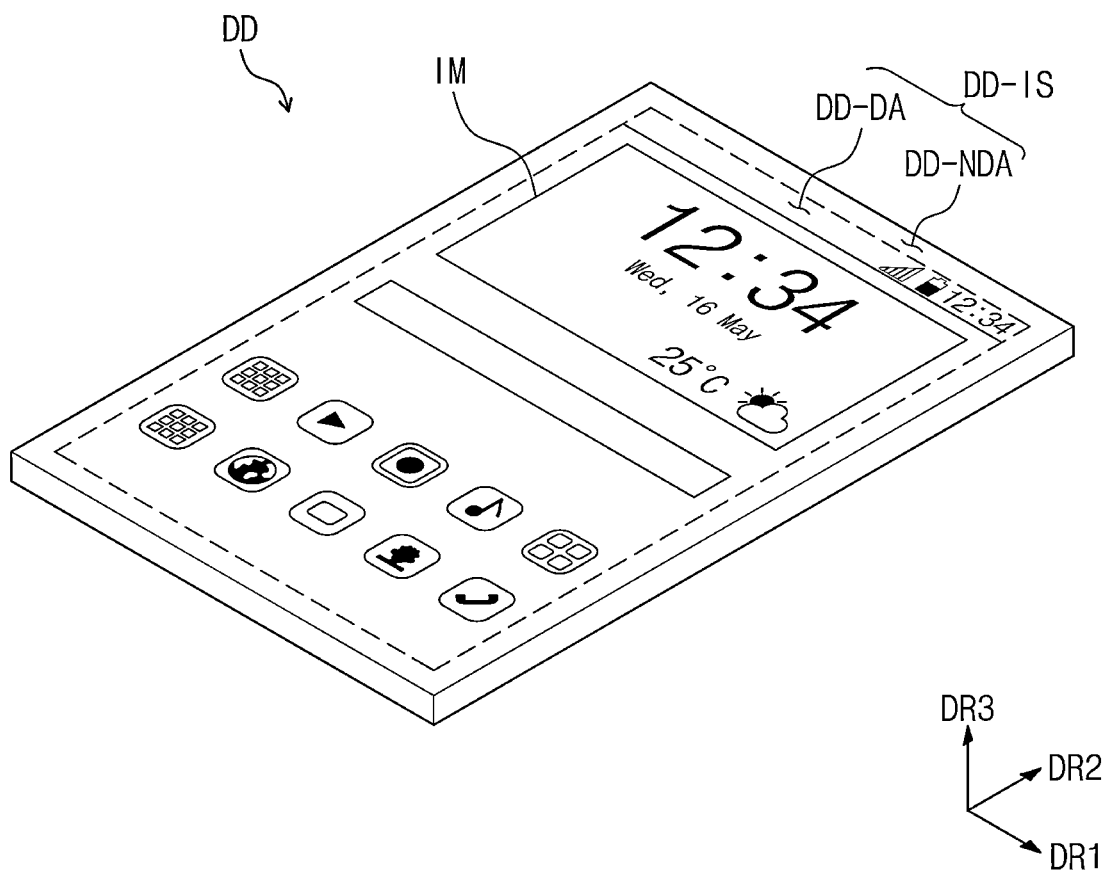
FIG. 1 is a perspective view illustrating an exemplary embodiment of a display device according to the invention.

The invention now will be described more fully hereinafter with reference to the accompanying drawings, in which various exemplary embodiments are shown. The invention may, however, be embodied in many different forms, and should not be construed as limited to the exemplary embodiments set forth herein. Rather, these exemplary embodiments are provided so that this disclosure will be thorough and complete, and will fully convey the scopes of the invention to those skilled in the art. Like reference numerals refer to like elements throughout.

It will be understood that when an element such as a layer, region or substrate is referred to as being "on" another element, it can be directly on the other element or intervening elements may be present. In contrast, the term "directly" means that there are no intervening elements. As used herein, the term "and/or" includes any and all combinations of one or more of the associated listed items.

The terminology used herein is for the purpose of describing particular exemplary embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the drawing figures. It will be understood that the spatially relative terms are intended to encompass different orientations of the device in use or operation in addition to the orientation depicted in the drawing figures. For example, if the device in the drawing figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Exemplary embodiments are described herein with reference to cross-sectional illustrations and/or plane illustrations that are idealized exemplary illustrations. In the drawings, the thicknesses of layers and regions are exaggerated for clarity. Accordingly, variations from the shapes of the illustrations as a result, for example, of manufacturing techniques and/or tolerances, are to be expected. Thus, exemplary embodiments should not be construed as limited to the shapes of regions illustrated herein but are to include deviations in shapes that result, for example, from manufacturing. For example, an etching region illustrated as a rectangle will, typically, have rounded or curved features. Thus, the regions illustrated in the drawing figures are schematic in nature and their shapes are not intended to illustrate the actual shape of a region of a device and are not intended to limit the scope of exemplary embodiments.

Hereinafter, exemplary embodiments of the invention will be described in detail with reference to the accompanying drawings.

Figure 2:
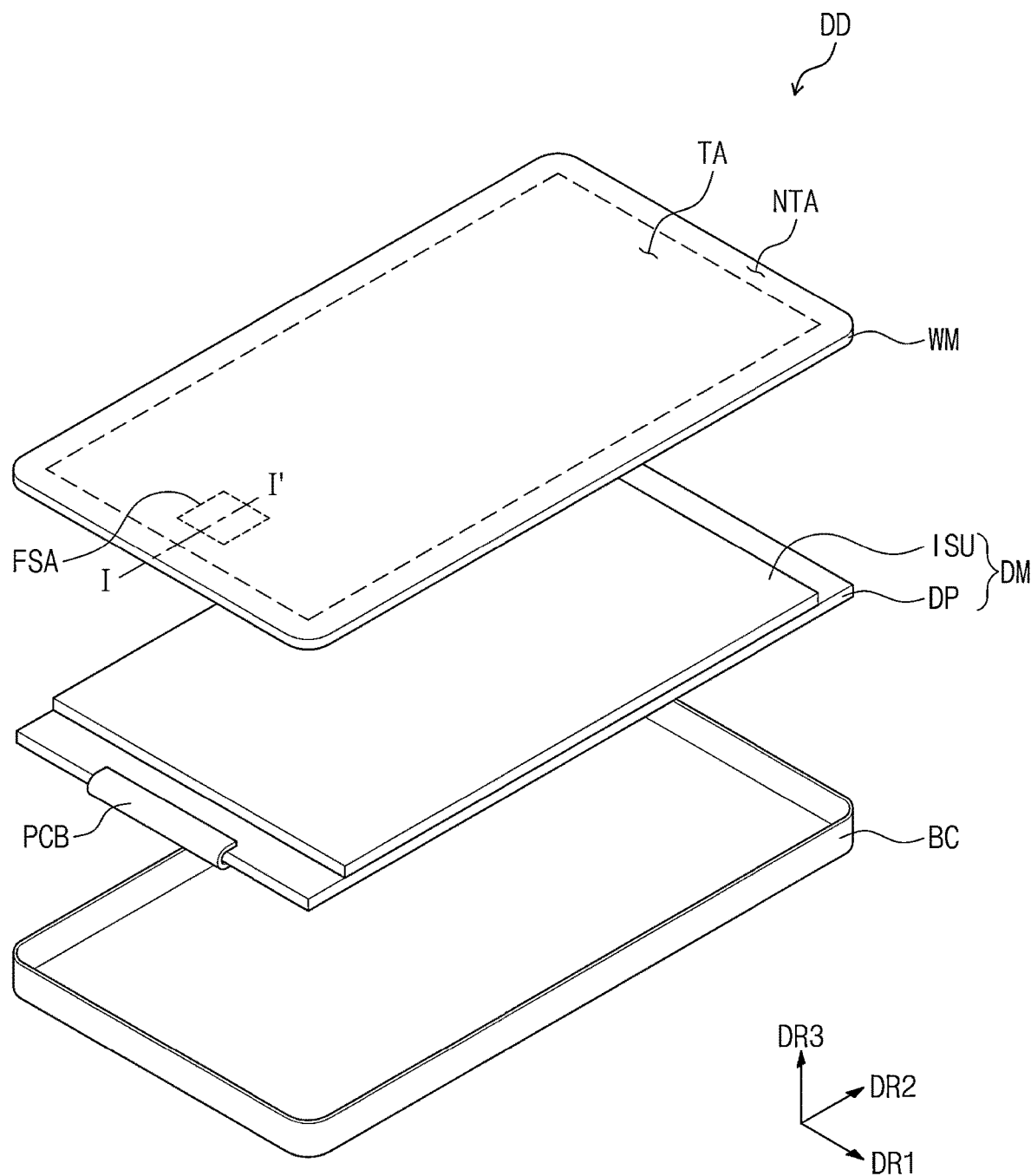
FIG. 2 is an exploded perspective view illustrating an exemplary embodiment of a display device according to the invention.
Figure 3A:
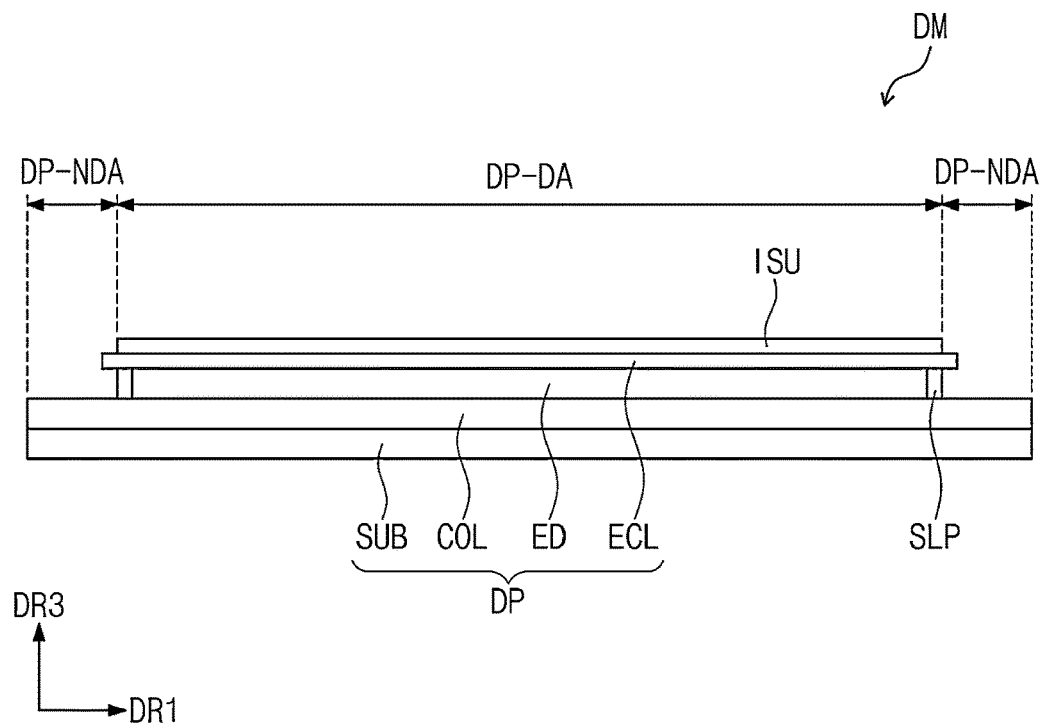
FIG. 3A is a cross-sectional view illustrating an exemplary embodiment of a display module according to the invention.
Figure 3B:
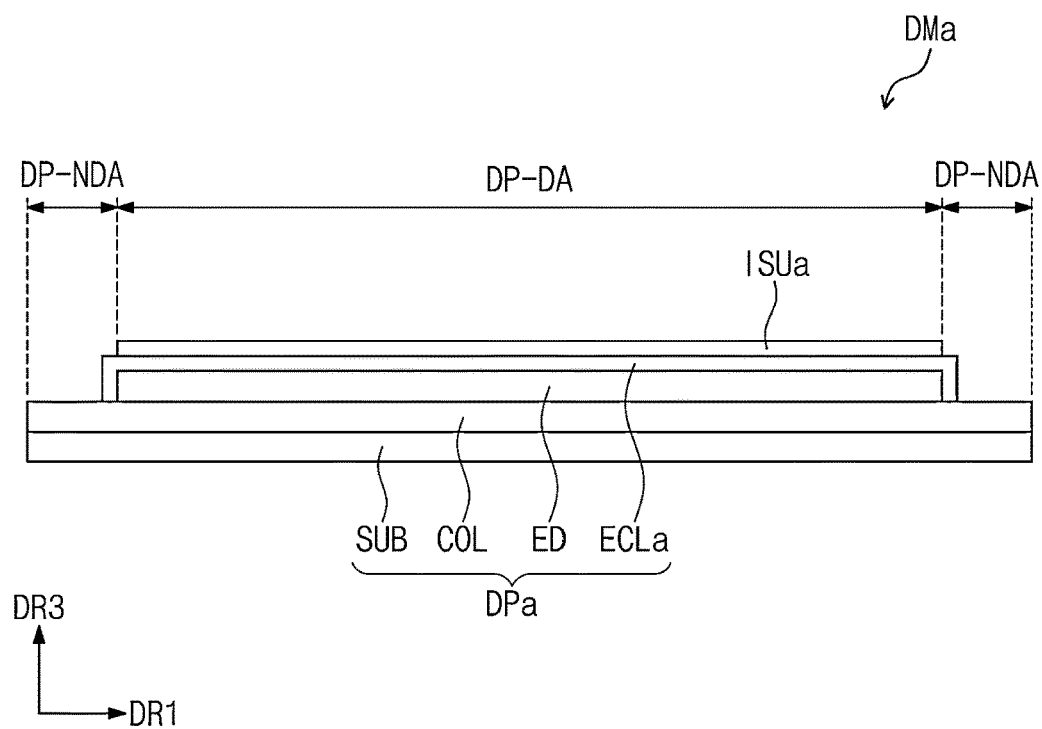
FIG. 3B is a cross-sectional view illustrating another exemplary embodiment of a display module according to the invention.

FIG. 1 is a perspective view illustrating a display device according to an exemplary embodiment of the invention. FIG. 2 is an exploded perspective view illustrating a display device according to an exemplary embodiment of the invention. FIG. 3A is a cross-sectional view illustrating a display module according to an exemplary embodiment of the invention. FIG. 3B is a cross-sectional view illustrating a display module according to another exemplary embodiment of the invention.

Referring to FIG. 1, a display device DD may display an image IM through a display surface DD-IS. In the illustrated exemplary embodiment, the display device DD including a flat display surface DD-IS is illustrated. However, the invention is not limited thereto. In other exemplary embodiments, the display device DD may include a curved display surface or a three-dimensional ("3D") display surface. The 3D display surface may include a plurality of display areas extending in different directions from each other. In an exemplary embodiment, the 3D display surface may include a polygonal pillar-shaped display surface, for example.

In an exemplary embodiment, the display device DD may be a flexible display device. However, the invention is not limited thereto. In another exemplary embodiment, the display device DD may be a rigid display device.

In addition, even though not shown in the drawings, electronic modules, a camera module and a power module, which are disposed (e.g., mounted) on a main board, may be disposed together with the display device DD in a bracket and/or a case to constitute a mobile phone. The display device DD according to the invention may be applied to large-sized electronic devices (e.g., televisions and monitors) and small and middle-sized electronic devices (e.g., tablets, car navigation units, game consoles, and smart watches).

The display surface DD-IS may be parallel to a plane defined by a first direction DR1 and a second direction DR2. A normal direction (i.e., a thickness direction of the display device DD) of the display surface DD-IS may be indicated by a third direction DR3. A front surface (or a top surface) and a rear surface (or a bottom surface) of each of members or units described hereinafter may be defined by the third direction DR3. However, the first to third directions DR1, DR2 and DR3 in the illustrated exemplary embodiment are illustrated as an example of the invention, and directions indicated by the first to third directions DR1, DR2 and DR3 may be changed into opposite directions.

As illustrated in FIG. 1, the display surface DD-IS may include a display area DD-DA in which the image IM is displayed, and a bezel area DD-NDA adjacent to the display area DD-DA. An image IM may not be displayed in the bezel area DD-NDA. In FIG. 1, application icons and a clock box are illustrated as an example of the image IM.

In the illustrated exemplary embodiment, the display area DD-DA may have a rectangular shape, and the bezel area DD-NDA may have a shape surrounding the display area DD-DA in a plan view. However, the invention is not limited thereto. The shapes of the display area DD-DA and the bezel area DD-NDA may be variously designed. In an exemplary embodiment, the bezel area DD-NDA may be disposed adjacent to only one side of the display area DD-DA or may be omitted, for example.

Referring to FIG. 2, the display device DD may include a window member WM, a display module DM, a circuit board PCB, and a receiving member BC.

The window member WM may be disposed on the display module DM and may transmit an image, provided from the display module DM, through a transmission area TA. In detail, the window member WM may include the transmission area TA and a non-transmission area NTA. The transmission area TA may overlap the display area DD-DA and may have a shape corresponding to the shape of the display area DD-DA. The image IM displayed in the display area DD-DA of the display device DD may be visible to the outside through the transmission area TA of the window member WM.

The non-transmission area NTA may overlap the bezel area DD-NDA and may have a shape corresponding to the shape of the bezel area DD-NDA. A light transmittance of the non-transmission area NTA may be less than a light transmittance of the transmission area TA. However, the invention is not limited thereto. In another exemplary embodiment, the non-transmission area NTA may be omitted.

In an exemplary embodiment, the window member WM may include glass, sapphire, or plastic, for example. The window member WM is a single layer in FIG. 2. However, the invention is not limited thereto. In an alternative exemplary embodiment, the window member WM may include a plurality of layers. In an exemplary embodiment, the window member WM may include a base layer and at least one printed layer disposed on a rear surface of the base layer. The printed layer may overlap the non-transmission area NTA. The printed layer may have a predetermined color. In an exemplary embodiment, the printed layer may have a black color or may have another color different from the black color, for example.

According to an exemplary embodiment of the invention, the transmission area TA may include a sensing area FSA.

The sensing area FSA may overlap the transmission area TA and may be an area for recognizing a fingerprint.

If the sensing area FSA overlaps only the non-transmission area NTA, an area (or a size) of the non-transmission area NTA may be increased by an area (or a size) of the sensing area FSA. However, the sensing area FSA may overlap the transmission area TA (i.e., the display area DD-DA) in the display device DD according to the exemplary embodiments of the invention, and thus the area (or the size) of the non-transmission area NTA may be reduced. As a result, an area (or a size) of the transmission area TA may be increased or enlarged.

A sensor unit overlapping the sensing area FSA may be disposed on a rear surface of the display module DM. This will be described later in detail.

The display module DM may be disposed between the window member WM and the receiving member BC. The display module DM may include a display panel DP and an input sensing unit ISU.

The display panel DP may generate an image and may provide the generated image to the window member WM. According to some exemplary embodiments of the invention, the display panel DP may be, but not limited to, an organic light emitting display panel, a liquid crystal display panel, or a quantum-dot light emitting display panel. The organic light emitting display panel may include organic light emitting elements. The liquid crystal display panel may include liquid crystal molecules. The quantum-dot light emitting display panel may include quantum dots or quantum rods.

The case in which the display panel DP is the organic light emitting display panel will be described hereinafter as an example. However, the invention is not limited thereto. In other words, other various display panels may be applied to exemplary embodiments of the invention.

The input sensing unit ISU may be disposed between the window member WM and the display panel DP. The input sensing unit ISU may sense an external input provided from the outside. The external input may be provided in various forms. In an exemplary embodiment, the external input may include at least one of various external inputs such as a part (e.g., a finger) of a body of a user, a stylus pen, light, heat, and pressure. In addition, the external input may include an approaching spatial touch (e.g., a hovering touch) as well as a touch of the part of the body of the user, for example.

The input sensing unit ISU may be disposed directly on the display panel DP. In the illustrated exemplary embodiment, the input sensing unit ISU may be unitary with the display panel DP by continuous processes. However, the invention is not limited thereto. In another exemplary embodiment, the input sensing unit ISU may be provided as a separate panel and then may be coupled to the display panel DP by an adhesive member.

The receiving member BC may be coupled to the window member WM. The receiving member BC may provide a rear surface of the display device DD and may be coupled to the window member WM to define an inner space. The receiving member BC may include a material having relatively high rigidity. In an exemplary embodiment, the receiving member BC may include a plurality of frames and/or plates, which include glass, plastic, and/or a metal, for example. The receiving member BC may stably protect the components of the display device DD, which are received in the inner space of the receiving member BC, from an external impact.

In the above description, the receiving member BC may include the material having the high rigidity. However, the invention is not limited thereto. In another exemplary embodiment, the receiving member BC may include a flexible material. Even though not shown in the drawings, the display device DD according to certain exemplary embodiments of the invention may be foldable or bendable. Thus, at least some components included in the display device DD may also have flexibility.

Referring to FIG. 3A, the display module DM according to an exemplary embodiment will be described in detail. The display module DM may include the display panel DP and the input sensing unit ISU described with reference to FIG. 2.

The display panel DP may include a substrate SUB, a circuit layer COL, a display element layer ED, and an encapsulation member ECL. The display panel DP may include a display area DP-DA and a bezel area DP-NDA. The display area DP-DA and the bezel area DP-NDA of the display panel DP may overlap the display area DD-DA and the bezel area DD-NDA of the display device DD described with reference to FIG. 1, respectively. In certain exemplary embodiments, the bezel area DP-NDA may be adjacent to one side of the display area DP-DA or may be omitted.

The substrate SUB may support components of the display panel DP and the input sensing unit ISU and may include a flexible material. In an exemplary embodiment, the substrate SUB may include a plastic substrate, a glass substrate, or an organic/inorganic composite substrate, for example. In an alternative exemplary embodiment, the substrate SUB may have a stack structure including a plurality of insulating layers. In an exemplary embodiment, the plastic substrate may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, or a perylene-based resin, for example.

The circuit layer COL may include a plurality of insulating layers, a plurality of conductive layers, and a semiconductor layer. The plurality of conductive layers of the circuit layer COL may include signal lines and/or a control circuit of a pixel.

The display element layer ED may overlap the display area DP-DA and may be disposed on the substrate SUB. The display element layer ED may include display elements, e.g., organic light emitting diodes. However, the invention is not limited thereto. In other exemplary embodiments, the display element layer ED may include inorganic light emitting diodes or organic-inorganic hybrid light emitting diodes, depending on a kind of the display panel DP.

The encapsulation member ECL may encapsulate the display element layer ED. In an exemplary embodiment, the encapsulation member ECL may overlap the display area DP-DA and the bezel area DP-NDA, for example. In an alternative exemplary embodiment, the encapsulation member ECL may overlap the display area DP-DA but may not overlap the bezel area DP-NDA.

In an exemplary embodiment, the encapsulation member ECL may be an encapsulation substrate, for example. The encapsulation member ECL may protect the display element layer ED from a foreign material such as moisture, oxygen and/or dust particles. The encapsulation member ECL may be coupled to the substrate SUB by a sealing member SLP. In an exemplary embodiment, the sealing member SLP may include a frit, for example. However, the material of the sealing member SLP is not limited thereto.

The input sensing unit ISU may overlap the display area DP-DA and may be disposed on the encapsulation member ECL.

In FIG. 3A, the input sensing unit ISU may be disposed directly on the encapsulation member ECL by continuous processes. However, the invention is not limited thereto. In another exemplary embodiment, an adhesive member (not shown) may be provided between the input sensing unit ISU and the encapsulation member ECL, and the input sensing unit ISU may be directly disposed on (e.g., adhered to) the encapsulation member ECL by the adhesive member.

Referring to FIG. 3B, a display module DMa may include a display panel DPa and an input sensing unit ISUa. An encapsulation member ECLa of the display module DMa of FIG. 3B may be different from the encapsulation member ECL of the display module DM of FIG. 3A, and the other components of the display module DMa of FIG. 3B may be substantially the same as the other components of the display module DM of FIG. 3A, respectively.

The display panel DPa may include the substrate SUB, the circuit layer COL, the display element layer ED, and the encapsulation member ECLa.

The encapsulation member ECLa may encapsulate the display element layer ED. In an exemplary embodiment, the encapsulation member ECLa may overlap the display area DP-DA and the bezel area DP-NDA, for example. In an alternative exemplary embodiment, the encapsulation member ECLa may overlap the display area DP-DA but may not overlap the bezel area DP-NDA. The encapsulation member ECLa may include at least one insulating layer. In an exemplary embodiment, the encapsulation member ECLa may include at least one encapsulation organic layer and at least one encapsulation inorganic layer.

The encapsulation inorganic layer may protect the display element layer ED from moisture/oxygen, and the encapsulation organic layer may protect the display element layer ED from a foreign material such as dust particles. In an exemplary embodiment, the encapsulation inorganic layer may include at least one of, but not limited to, a silicon nitride layer, a silicon oxynitride layer, a silicon oxide layer, a titanium oxide layer, or an aluminum oxide layer, for example. In an exemplary embodiment, the encapsulation organic layer may include, but not limited to, an acrylic-based organic layer, for example.

The input sensing unit ISUa may be disposed directly on the encapsulation member ECLa by continuous processes. In an alternative exemplary embodiment, the input sensing unit ISUa may be coupled to the encapsulation member ECLa by an adhesive member. In this case, the input sensing unit ISUa may include a base layer and a sensing circuit layer. The sensing circuit layer may include a plurality of insulating layers and a plurality of conductive layers.

Figure 4:
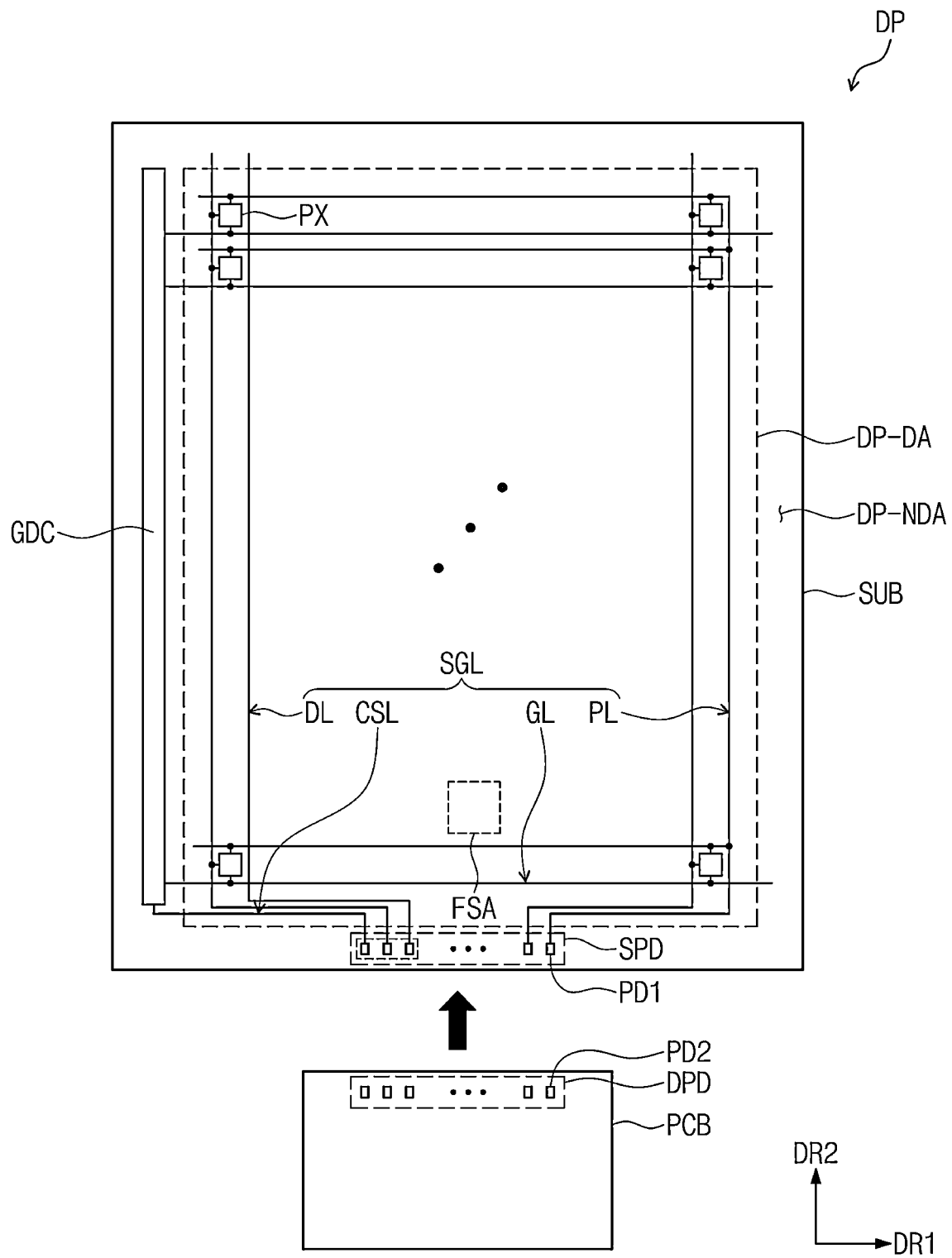
FIG. 4 is a plan view illustrating an exemplary embodiment of a display panel according to the invention.
Figure 5:
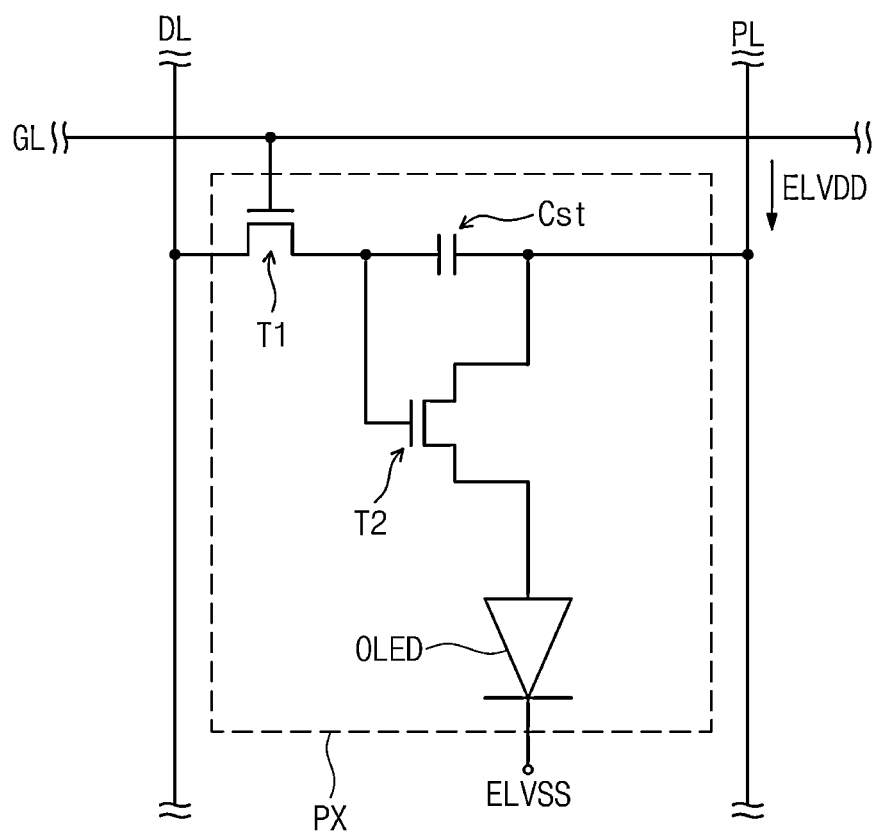
FIG. 5 is an equivalent circuit diagram of a pixel illustrated in FIG. 4.

FIG. 4 is a plan view illustrating a display panel according to an exemplary embodiment of the invention. FIG. 5 is an equivalent circuit diagram of a pixel illustrated in FIG. 4.

Referring to FIG. 4, the display panel DP may include a driving circuit GDC, a plurality of signal lines SGL, a plurality of first pads PD1 disposed in a first bonding area SPD, and a plurality of pixels PX.

The pixels PX may be disposed in the display area DP-DA. Each of the pixels PX may include an organic light emitting diode and a pixel driving circuit connected to the organic light emitting diode. The driving circuit GDC, the signal lines SGL, the first pads PD1 and the pixel driving circuit may be included in the circuit layer COL illustrated in FIG. 3A.

The driving circuit GDC may be a scan driving circuit. The driving circuit GDC may generate a plurality of scan signals and may sequentially output the scan signals to a plurality of scan lines GL to be described below. The driving circuit GDC may further output other control signals to the pixel driving circuits of the pixels PX.

The driving circuit GDC may include a plurality of thin film transistors provided by the same process (e.g., a low-temperature polycrystalline silicon ("LTPS") process or a low-temperature polycrystalline oxide ("LTPO") process) as that providing the pixel driving circuits of the pixels PX.

The signal lines SGL may be disposed on the substrate SUB. The signal lines SGL may include scan lines GL, data lines DL, a power line PL, and a control signal line CSL. Each of the scan lines GL may be connected to corresponding ones of the pixels PX, and each of the data lines DL may be connected to corresponding ones of the pixels PX. The power line PL may be connected to the pixels PX. The control signal line CSL may provide control signals to the driving circuit GDC.

The signal lines SGL may overlap the display area DP-DA and the bezel area DP-NDA. Each of the signal lines SGL may include a pad portion and a line portion. The line portion may overlap the display area DP-DA and the bezel area DP-NDA. The pad portion may be connected to an end of the line portion. The pad portion may be disposed in the bezel area DP-NDA and may correspond to each of the first pads PD1 disposed in the first bonding area SPD.

The circuit board PCB may be connected to the display panel DP and may include a plurality of second pads PD2 disposed in a second bonding area DPD. The second pads PD2 may be electrically bonded to the first pads PD1 disposed in the first bonding area SPD of the display panel DP, and thus a plurality of driving signals may be transmitted to the display panel DP through the first and second pads PD1 and PD2. The circuit board PCB may be rigid or flexible. In an exemplary embodiment, when the circuit board PCB is flexible, a flexible printed circuit board may be used as the circuit board PCB, for example.

The circuit board PCB and the display panel DP separated from each other are illustrated in FIG. 4 for the purpose of ease and convenience in description. However, a portion of the circuit board PCB may be connected to a portion of the bezel area DP-NDA of the display panel DP, and the circuit board PCB may overlap the display area DP-DA and the bezel area DP-NDA. In an exemplary embodiment, as illustrated in FIG. 2, the circuit board PCB may be bent along one side surface of the substrate SUB so as to be disposed on a rear surface of the display panel DP, for example.

In this case, the circuit board PCB may overlap the sensing area FSA in a plan view or may not overlap the sensing area FSA in a plan view.

FIG. 5 illustrates one scan line GL, one data line DL, the power line PL, and the pixel PX connected to the lines GL, DL and PL. However, the configuration of the pixel PX is not limited to FIG. 5 but may be variously modified.

The pixel PX may include the organic light emitting diode OLED and the pixel driving circuit.

The organic light emitting diode OLED may be a front surface light emitting type diode or a rear surface light emitting type diode. The pixel PX may include a first transistor (or a switching transistor) T1, a second transistor (or a driving transistor) T2 and a capacitor Cst which constitute the pixel driving circuit for driving the organic light emitting diode OLED. A first power source voltage ELVDD may be provided to the second transistor T2, and a second power source voltage ELVSS may be provided to the organic light emitting diode OLED. The second power source voltage ELVSS may be lower than the first power source voltage ELVDD.

The first transistor T1 may output a data signal, applied to the data line DL, in response to a scan signal applied to the scan line GL. The capacitor Cst may be charged with a voltage corresponding to the data signal received from the first transistor T1. The second transistor T2 may be connected to the organic light emitting diode OLED. The second transistor T2 may control a driving current flowing through the organic light emitting diode OLED in response to the amount of charges stored in the capacitor Cst.

The equivalent circuit is illustrated as an example of the pixel PX, and the invention is not limited thereto. In other exemplary embodiments, the pixel PX may further include a plurality of transistors and/or may include two or more capacitors. In still other exemplary embodiments, the organic light emitting diode OLED may be connected between the power line PL and the second transistor T2.

Figure 6:
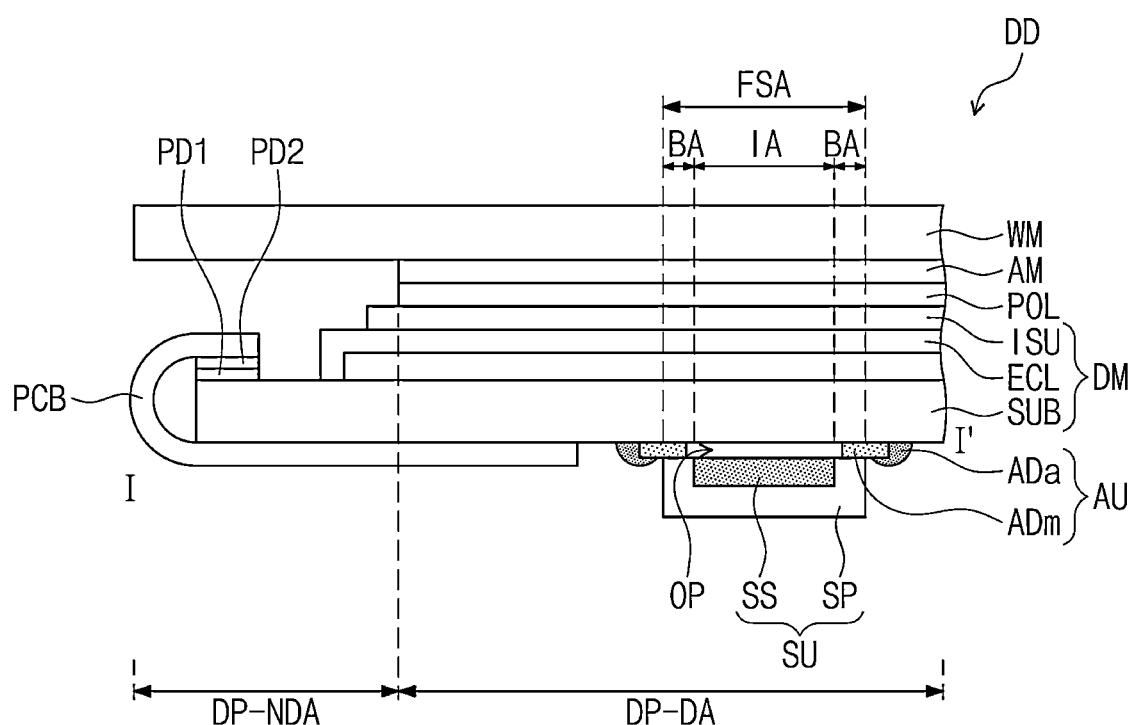
FIG. 6 is a cross-sectional view taken along line I-I' of FIG. 2.
Figure 7:
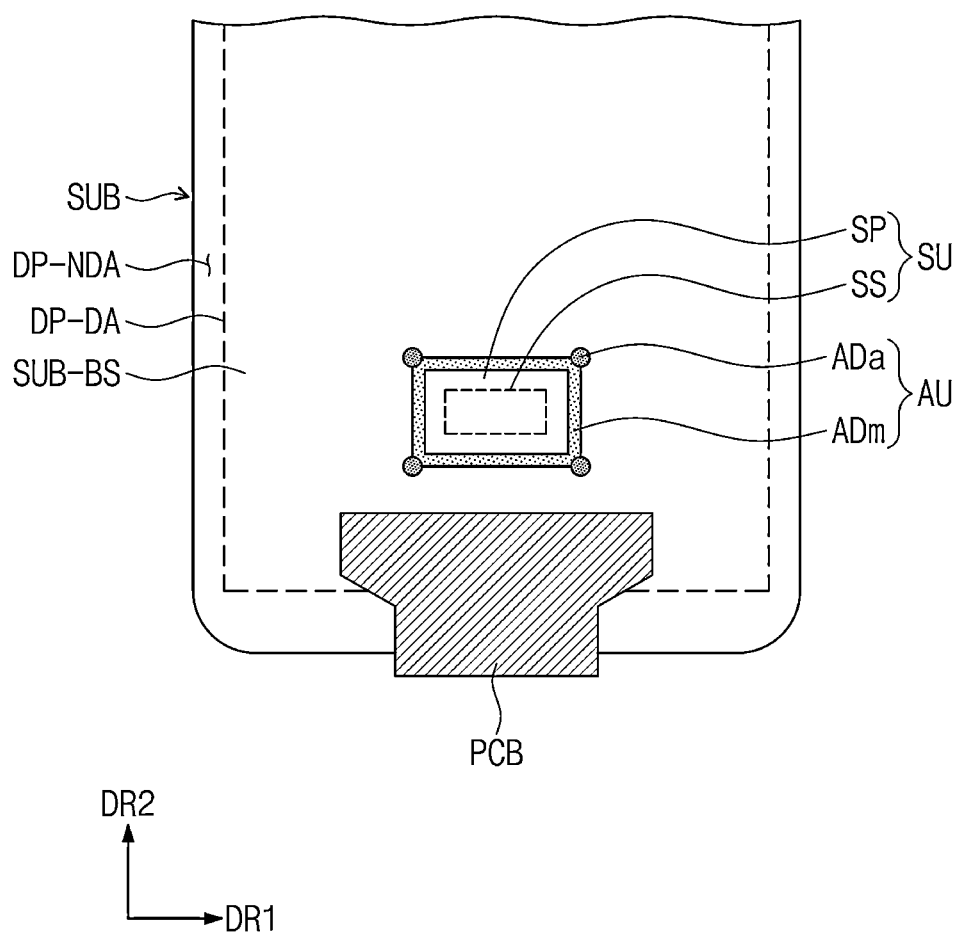
FIG. 7 is a plan view illustrating an exemplary embodiment of a rear surface of a display module according to the invention.

FIG. 6 is a cross-sectional view taken along line I-I' of FIG. 2. FIG. 7 is a plan view illustrating a rear surface of a display module according to an exemplary embodiment of the invention.

A display device DD illustrated in FIG. 6 may further include a polarizing layer POL, a window adhesive member AM, a sensor unit SU, and an adhesive member AU, as compared with the display device DD illustrated in FIG. 2.

The polarizing layer POL may be disposed between the display module DM and the window member WM. The polarizing layer POL may polarize external light incident through the window member WM, and thus it is possible to prevent circuit elements included in the display module DM from being visible to the outside. In certain exemplary embodiments, the polarizing layer POL may be omitted. The window adhesive member AM may be disposed between the polarizing layer POL and the window member WM to adhere the window member WM to the polarizing layer POL. In an exemplary embodiment, the window adhesive member AM may include an optically clear adhesive film, an optically clear resin, or a pressure sensitive adhesive film, for example.

As described above with reference to FIG. 2, the sensing area FSA for recognizing an external fingerprint may overlap the display area DP-DA. However, the invention is not limited thereto. In another exemplary embodiment, a portion of the sensing area FSA may overlap the bezel area DP-NDA.

The sensor unit SU may overlap the sensing area FSA and may be disposed on a rear surface of the substrate SUB. The sensor unit SU may include a sensor SS and a package SP in which the sensor SS is disposed (e.g., mounted).

According to some exemplary embodiments of the invention, the sensor SS may be a fingerprint recognition sensor and may operate in an optical type, an ultrasonic type, or a capacitive type, for example. However, the invention is not limited to the exemplary embodiment in which the sensor SS is the fingerprint recognition sensor. In other exemplary embodiments, the sensor SS may include a camera, a pressure sensitive sensor, a proximity sensor, a brightness sensor, and/or a temperature sensor, for example, disposed under the substrate SUB.

Hereinafter, the optical type fingerprint recognition sensor will be described as an example of the sensor SS of the sensor unit SU according to the exemplary embodiment illustrated in FIG. 6. The optical type fingerprint recognition sensor may irradiate light to a fingerprint and then may sense light reflected by the fingerprint to recognize the fingerprint.

The sensing area FSA may include a recognition area IA and a bonding area BA surrounding the recognition area IA in a plan view. The sensor SS may overlap the recognition area IA for recognizing a fingerprint, and the package SP may overlap the recognition area IA and the bonding area BA. In other words, the package SP may overlap the entirety of the sensing area FSA.

The sensor SS facing the substrate SUB may be disposed (e.g., mounted) in the package SP, and the package SP may transfer a signal sensed from the sensor SS to the circuit board PCB. Even though not shown in the drawings, the package SP may include a control circuit electrically connected to the circuit board PCB and the sensor SS.

The adhesive member AU may adhere the sensor unit SU to the substrate SUB. The adhesive member AU may include a first adhesive member ADm and a second adhesive member ADa.

The first adhesive member ADm may be disposed on the rear surface of the substrate SUB and, more particularly, may be disposed between the package SP and the substrate SUB. The first adhesive member ADm may not overlap the recognition area IA but may overlap the bonding area BA.

The first adhesive member ADm may be disposed on the rear surface of the substrate SUB to surround the sensor SS in a plan view. Thus, an opening OP may be defined between the substrate SUB and the sensor unit SU disposed on the first adhesive member ADm. The sensor SS may receive light, reflected from a fingerprint, through the opening OP defined by the first adhesive member ADm.

According to an exemplary embodiment of the invention, the first adhesive member ADm may include a thermal initiator that is activated under a condition that heat is provided. The thermal initiator of the first adhesive member ADm may be activated depending on a change in temperature by heat provided from the outside. A kind of the thermal initiator may be changed depending on a temperature of heat provided in a process of manufacturing the display device DD and/or a process time of a high-temperature process.

Thus, after the first adhesive member ADm is disposed between the package SP and the substrate SUB, heat may be provided from the outside to the first adhesive member ADm. As a result, the first adhesive member ADm may be hardened by the external heat, and the package SP and the substrate SUB may be fixed to each other by the first adhesive member ADm.

In an exemplary embodiment, the thermal initiator included in the first adhesive member ADm may include at least one of tert-amyl peroxybenzoate, 4,4'-azobis(4-cyanopentanoic acid), 1,1'-azobis(cyanocyclohexane), azobisisobutylronitirile ("AIBN"), 2,2-bis(tert-butylperoxy)butane, 1,1-bis(tert-butylperoxy)cyclohexane, benzoyl peroxide ("BPO"), 2,5-bis(tert-butylperoxy)-2,5-dimethylhexane, bis[1-(tert-butylperoxy)-1-methyl ethyl]benzene, 1,1-bis(tert-butylperoxy)-3,3,5-trimethylcyclohexane, tert-butyl hydroperoxide, tert-butyl peracetate, tert-butyl peroxide, tert-butyl peroxybenzoate, tert-butylperoxy isopropyl carbonate, cumene hydroperoxide, cyclohexanone peroxide, dicumyl peroxide, dodecanoyl peroxide, 2,4-pentanedione peroxide, or potassium peroxodisulfate, for example.

To harden the first adhesive member ADm disposed between the package SP and the substrate SUB, the display device DD may be moved into a chamber or apparatus for providing heat. However, when the heat is not provided to the first adhesive member ADm, the first adhesive member ADm and the substrate SUB may not be firmly fixed to each other. As a result, the first adhesive member ADm and the substrate SUB may move relative to each other, and thus the first adhesive member ADm may not be accurately aligned with the sensing area FSA.

However, according to the exemplary embodiment of the invention, the second adhesive member ADa may adhere the first adhesive member ADm to the substrate SUB. The second adhesive member ADa according to an exemplary embodiment of the invention may include a photoinitiator that is activated by ultraviolet ("UV") light.

In particular, the second adhesive member ADa may be disposed on at least a portion of the first adhesive member ADm and the substrate SUB, and the UV light may be irradiated from the outside to the second adhesive member ADa. The second adhesive member ADa may be hardened by the irradiation of the UV light, and thus the first adhesive member ADm and the substrate SUB may be fixed to each other by the second adhesive member ADa. In particular, the second adhesive member ADa may not overlap the sensor unit SU and may be directly disposed on (e.g., adhered to) at least a portion of the first adhesive member ADm and the substrate SUB.

As a result, the first adhesive member ADm may be fixed to the substrate SUB through the second adhesive member ADa hardened by the UV light, and thus the first adhesive member ADm may be accurately aligned with the sensing area FSA.

External UV light may not be irradiated to the first adhesive member ADm between the substrate SUB and the package SP which overlap the sensing area FSA. This may be because the UV light is reflected by the sensor unit SU of a metal material. Thus, the first adhesive member ADm according to the exemplary embodiment of the invention may include the thermal initiator and may be hardened by a thermal treatment process.

In an exemplary embodiment, the photoinitiator included in the second adhesive member ADa may include at least one of 2,2-dimethoxy-1,2-diphenylethan-1-one, 1-hydroxy-cyclohexyl-phenyl-ketone, 2-hydroxy-2-methyl-1-phenyl-1-propanone, 2-hydroxy-1-[4-(2-hydroxyethoxy)phenyl]-2-methyl-1-propanone, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butanone-1, 2-dimethylamino-2-(4-methyl-benzyl)-1-(4-morpholin-4-yl-phenyl)-butan-1-one, 2,4,6-trimethylbenzoyl-diphenylphosphine oxide, 2,4,6-trimethylbenzoyl-diphenyl phosphinate, bis(2,4,6-trimethylbenzoyl)-phenylphosphineoxide, [1-(4-phenylsulfanylbenzoyl)heptylideneamino]benzoate, [1-[9-ethyl-6-(2-methylbenzoyl)carbazol-3-yl]ethylideneamino] acetate, or bis(2,4-cyclopentadienyl)bis[2,6-difluoro-3-(1-pyrryl)phenyl] titanium (IV), for example.

Referring to FIG. 7, the sensor unit SU, the adhesive member AU and the circuit board PCB may be disposed on the rear surface SUB-BS of the substrate SUB.

The sensor SS of the sensor unit SU may be disposed (e.g., mounted) in the package SP to face the rear surface SUB-BS. The first adhesive member ADm may surround the sensor SS on the rear surface SUB-BS in a plan view. In addition, the first adhesive member ADm may overlap a portion of the package SP in a plan view. In other words, the first adhesive member ADm may be directly disposed on (e.g., adhered to) the package SP and the rear surface SUB-BS.

The second adhesive member ADa may overlap a portion of the first adhesive member ADm and may be directly disposed on (e.g., adhered to) the first adhesive member ADm and the rear surface SUB-BS. As illustrated in FIG. 7, the second adhesive member ADa may be disposed on each of corners of the first adhesive member ADm. In an exemplary embodiment, the second adhesive member ADa may be disposed at each of vertexes of the first adhesive member ADm in a plan view. However, the invention is not limited thereto, for example.

In another exemplary embodiment, the second adhesive member ADa may surround the first adhesive member ADm in a plan view and may be directly disposed on (e.g., adhered to) the first adhesive member ADm and the rear surface SUB-BS. In other words, the second adhesive member ADa may be a member for fixing the first adhesive member ADm to the substrate SUB, and the shape and the material of the second adhesive member ADa may be variously modified or changed.

The circuit board PCB may be spaced apart from the sensor unit SU in the second direction DR2. The circuit board PCB may be electrically connected to the sensor unit SU. In an exemplary embodiment, the circuit board PCB and the sensor unit SU may be connected to each other through a flexible printed circuit board, for example.

FIG. 8 is a flowchart illustrating a method for manufacturing a display device, according to an exemplary embodiment of the invention. FIGS. 9A to 9D are perspective views illustrating the method for manufacturing the display device in FIG. 8.

Figure 9A:
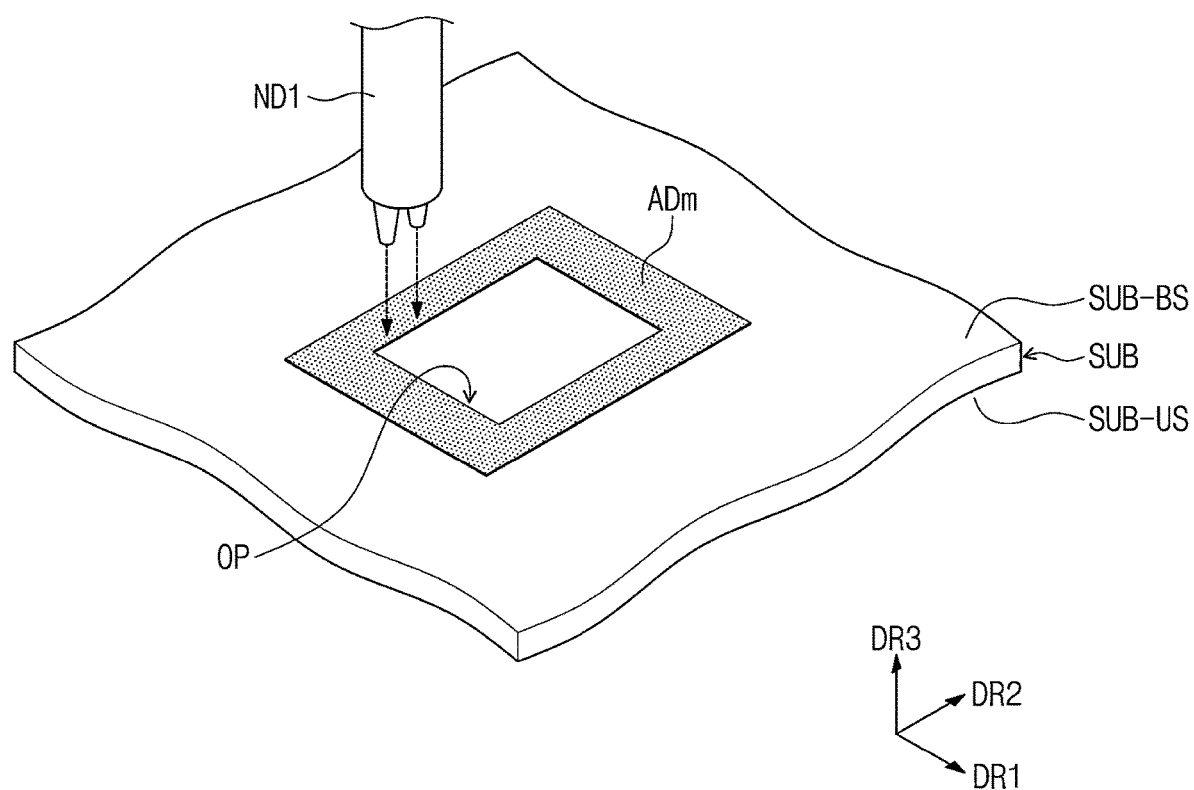
FIGS. 9A to 9D are perspective views illustrating the method for manufacturing the display device in FIG. 8.

Referring to FIGS. 8 and 9A, a first adhesive member ADm may be applied onto a rear surface SUB-BS of a substrate SUB by a first applying apparatus ND1 (S110). According to an exemplary embodiment of the invention, the first applying apparatus ND1 may provide or apply the first adhesive member ADm including the thermal initiator described above with reference to FIG. 6. External heat may not be provided to the first adhesive member ADm in the operation S110, and thus the first adhesive member ADm may not be firmly adhered to the substrate SUB.

In addition, the first applying apparatus ND1 may apply the first adhesive member ADm onto the rear surface SUB-BS in such a way that an opening OP is defined by the first adhesive member ADm. In the illustrated exemplary embodiment, the first adhesive member ADm has a rectangular shape, for example. However, the invention is not limited thereto. The shape of the first adhesive member ADm may be variously modified.

The circuit layer COL, the display element layer ED and the encapsulation member ECL which are described with reference to FIG. 3A may be disposed on a front surface (or a top surface) SUB-US of the substrate SUB.

Figure 9B:
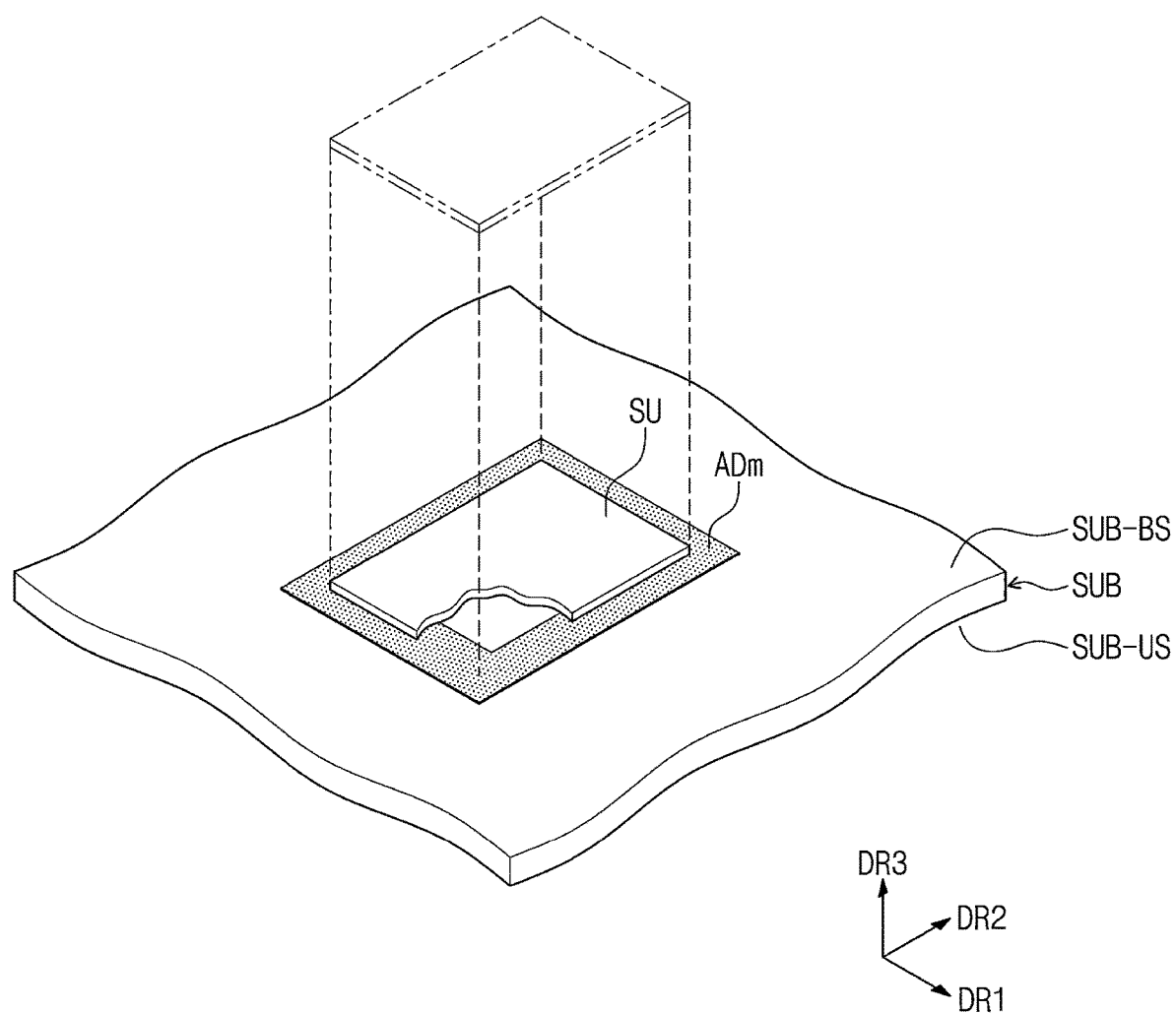

Referring to FIGS. 8 and 9B, a sensor unit SU may be disposed on the first adhesive member ADm (S120). The sensor unit SU may overlap at least a portion of the first adhesive member ADm. Like the operation S110, external heat may not be provided to the first adhesive member ADm in the operation S120, and thus the first adhesive member ADm may not firmly adhere the sensor unit SU to the substrate SUB.

Figure 9C:
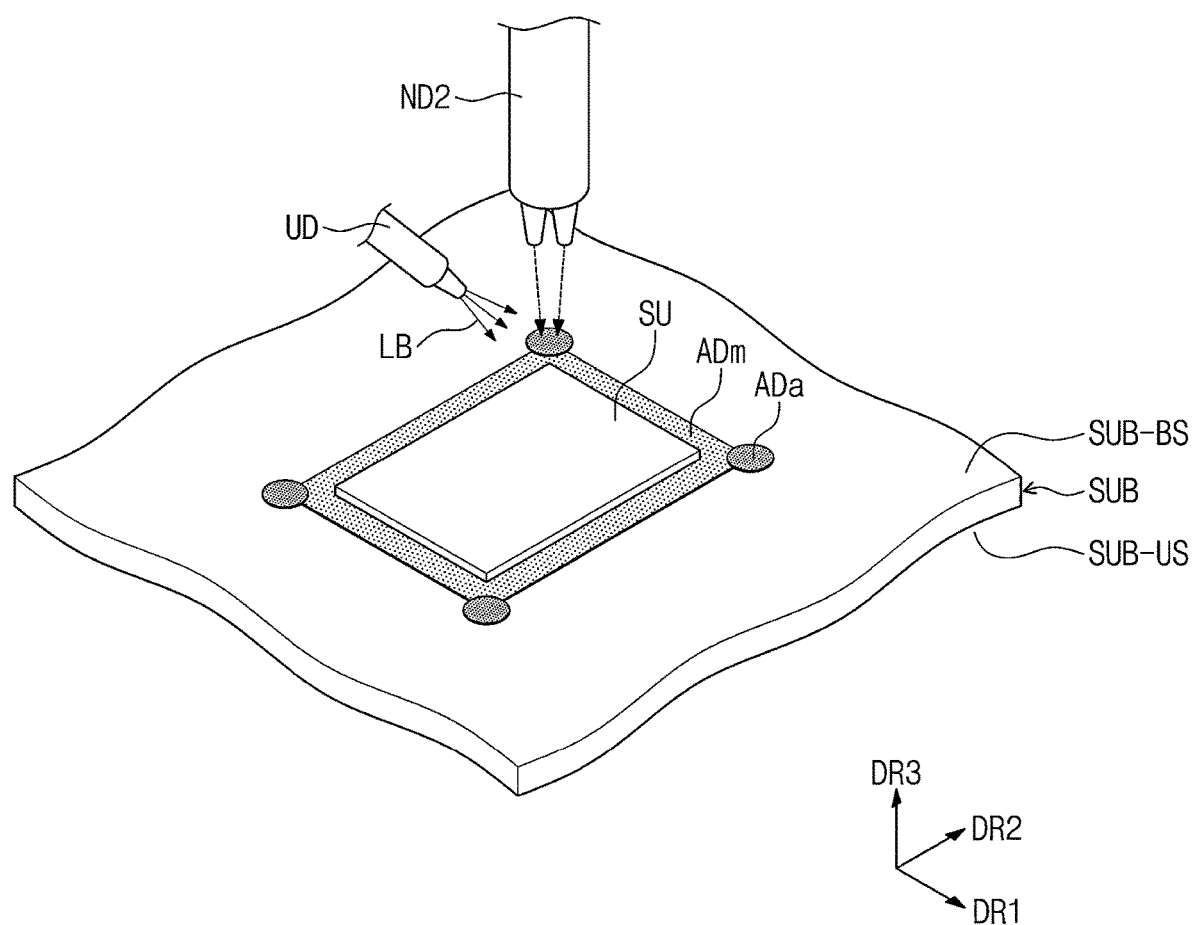

Referring to FIGS. 8 and 9C, a second adhesive member ADa may be applied onto the first adhesive member ADm and the rear surface SUB-BS by a second applying apparatus ND2 (S130). The second adhesive member ADa may overlap at least a portion of the first adhesive member ADm.

According to an exemplary embodiment of the invention, the second applying apparatus ND2 may provide or apply the second adhesive member ADa including the photoinitiator described above with reference to FIG. 6. The second adhesive member ADa may not overlap the sensor unit SU and may be exposed to the outside from the first adhesive member ADm and the sensor unit SU.

UV light LB may be irradiated to the second adhesive member ADa (S140). The UV light LB may be irradiated by a light apparatus UD. Since the second adhesive member ADa is fully exposed to the outside from the first adhesive member ADm and the sensor unit SU, the UV light LB may be irradiated to the entirety of the second adhesive member ADa. The second adhesive member ADa may be hardened by irradiating the UV light LB to the second adhesive member ADa. As a result, the first adhesive member ADm may be firmly fixed to the substrate SUB by the second adhesive member ADa.

According to an exemplary embodiment of the invention, the operation S130 and the operation S140 may be performed at the same time. In other words, the second adhesive member ADa may be applied onto the rear surface SUB-BS by the second applying apparatus ND2, and at the same time, the UV light LB may be irradiated to the second adhesive member ADa. Thus, before a thermal treatment process for providing external heat to the first adhesive member ADm, the first adhesive member ADm and the substrate SUB may be firmly fixed to each other by the second adhesive member ADa.

In another exemplary embodiment, the operation S130 and the operation S140 may be performed before the operation S120.

Figure 9D:
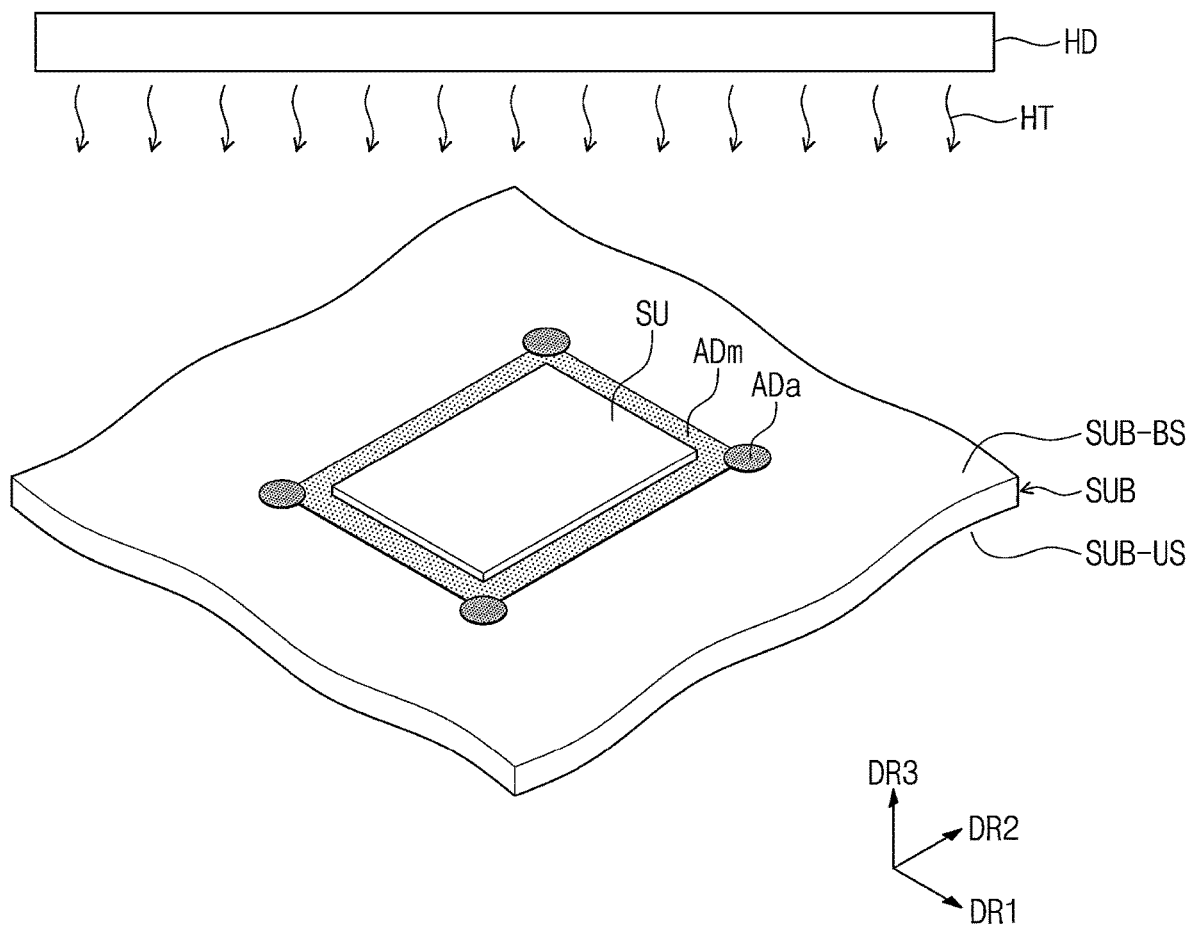

Referring to FIGS. 8 and 9D, external heat may be provided to the first adhesive member ADm (S150). The thermal initiator included in the first adhesive member ADm may be activated because a temperature is changed by the heat provided from the outside.

After the operation S140, the substrate SUB may be moved into a space in which a heat apparatus HD is disposed, to receive the external heat. In this case, since the substrate SUB and the first adhesive member ADm are fixed by the second adhesive member ADa, alignment between the substrate SUB and the first adhesive member ADm may be maintained.

The heat apparatus HD may provide heat HT to the entirety of the first adhesive member ADm. The thermal initiator included in the first adhesive member ADm may be activated by the heat HT, and thus adhesiveness of the first adhesive member ADm may be increased. In other words, since the heat HT is provided to the first adhesive member ADm, the first adhesive member ADm may be hardened.

In particular, the heat HT may be fully provided to the first adhesive member ADm disposed between the rear surface SUB-BS and the sensor unit SU, and thus the sensor unit SU may be firmly fixed to the rear surface SUB-BS.

Figure 10A:
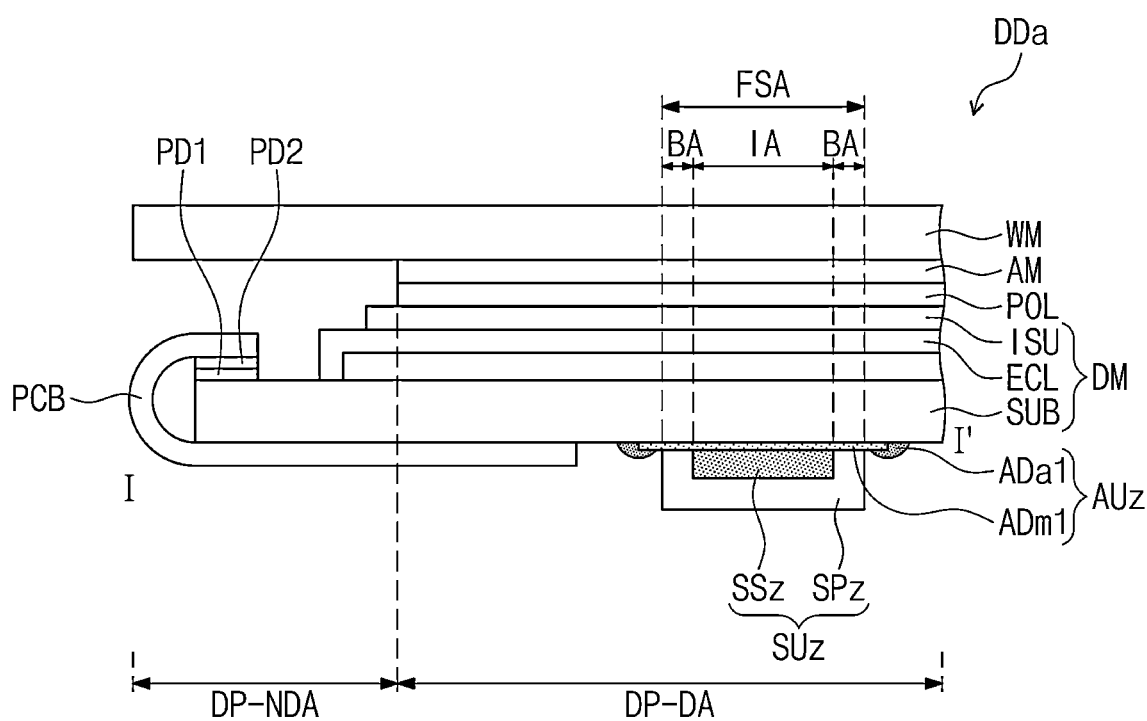
FIG. 10A is a cross-sectional view illustrating another exemplary embodiment of a display device according to the invention.
Figure 10B:
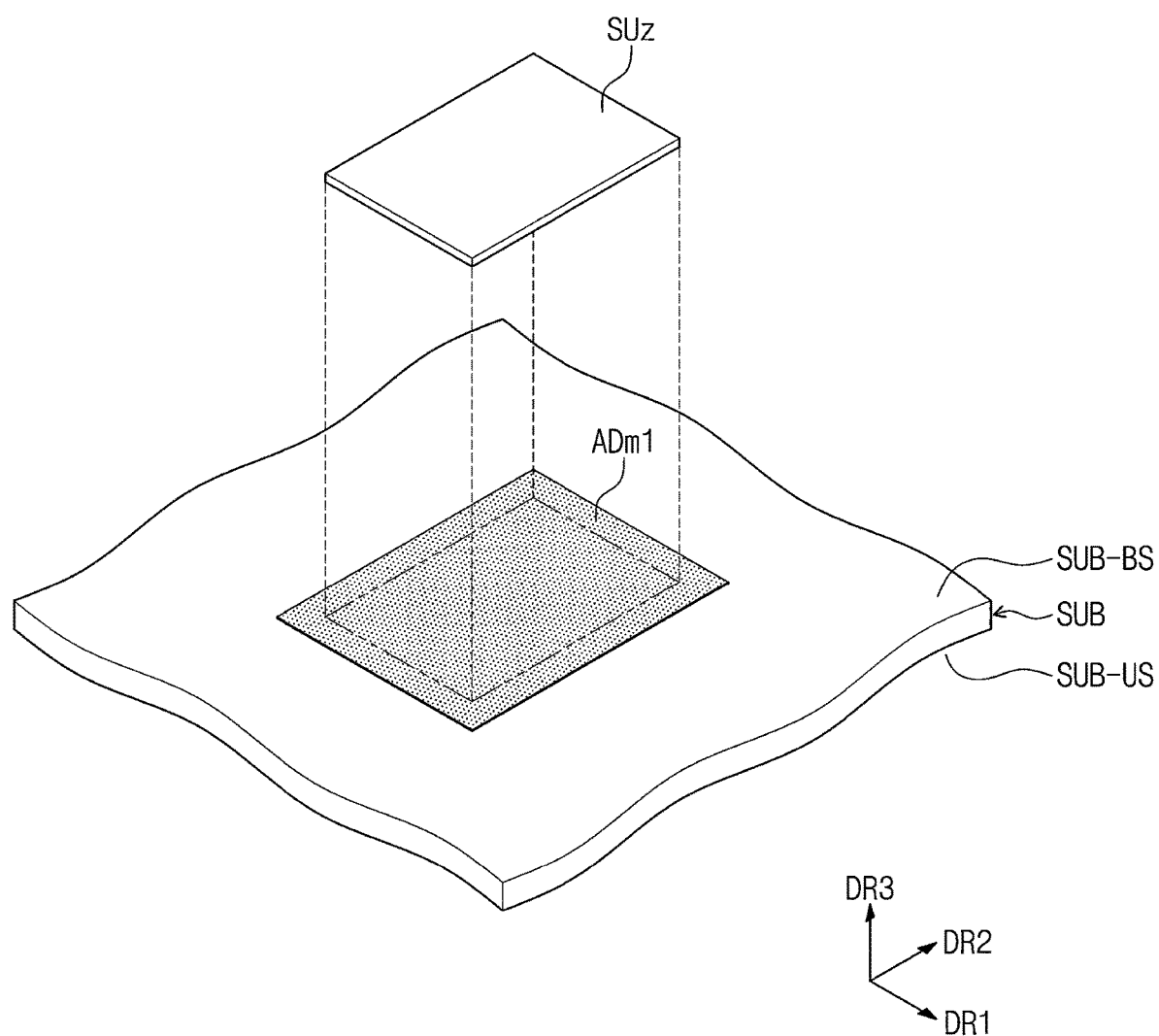
FIG. 10B is an exploded perspective view illustrating a sensor disposed on a rear surface of a substrate illustrated in FIG. 10A.

FIG. 10A is a cross-sectional view illustrating a display device according to another exemplary embodiment of the invention. FIG. 10B is an exploded perspective view illustrating a sensor disposed on a rear surface of a substrate illustrated in FIG. 10A.

Structures of a first adhesive member ADm1 and a sensor unit SUz of a display device DDa of FIG. 10A may be different from those of the first adhesive member ADm and the sensor unit SU of the display device DD of FIG. 6, the other components of the display device DDa of FIG. 10A may be substantially the same as corresponding components of the display device DD of FIG. 6.

In detail, referring to FIGS. 10A and 10B, the sensor unit SUz may include a sensor SSz and a package SPz in which the sensor SSz is disposed (e.g., mounted). According to an exemplary embodiment of the invention, the sensor unit SUz may be an ultrasonic type fingerprint recognition sensor. In an exemplary embodiment, the ultrasonic type fingerprint recognition sensor may recognize a fingerprint by ultrasonic signals emitted from a plurality of piezoelectric sensors included in the sensor SSz, for example.

An adhesive member AUz may include the first adhesive member ADm1 and a second adhesive member ADa1. The second adhesive member ADa1 may have the substantially same material and structure as those of the second adhesive member ADa illustrated in FIG. 6.

The first adhesive member ADm1 may be disposed on the rear surface SUB-BS of the substrate SUB. The first adhesive member ADm1 may overlap the entirety of the sensor unit SUz, and an opening may not be defined in the first adhesive member ADm1.

Since the sensor SSz of the sensor unit SUz is the ultrasonic type fingerprint recognition sensor, the sensor unit SUz may be fully adhered to the rear surface SUB-BS of the substrate SUB by the first adhesive member ADm1, as illustrated in FIG. 10B. In this case, a thickness of the first adhesive member ADm1 of FIG. 10A along the third direction DR3 may be less than a thickness of the first adhesive member ADm of FIG. 6 along the third direction DR3.

Figure 11A:
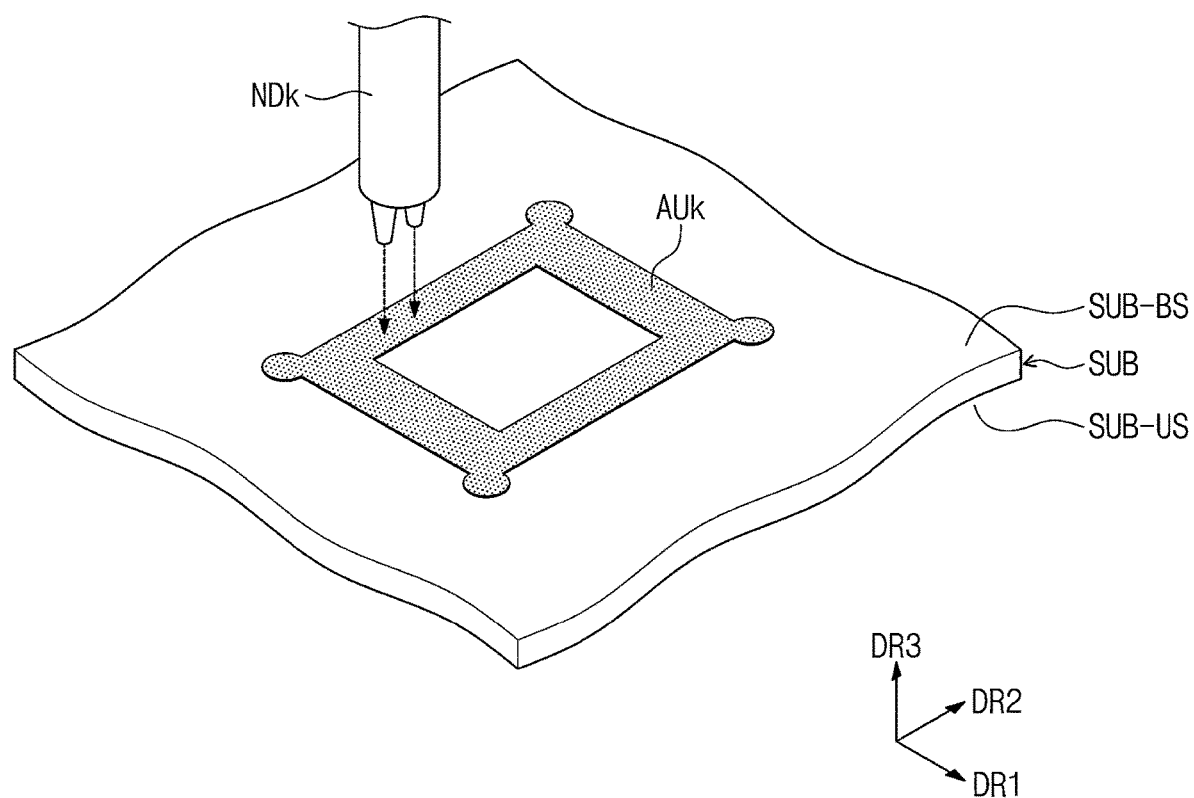
FIGS. 11A and 11B are perspective views illustrating another exemplary embodiment of a method for manufacturing a display device, according to the invention.
Figure 11B:
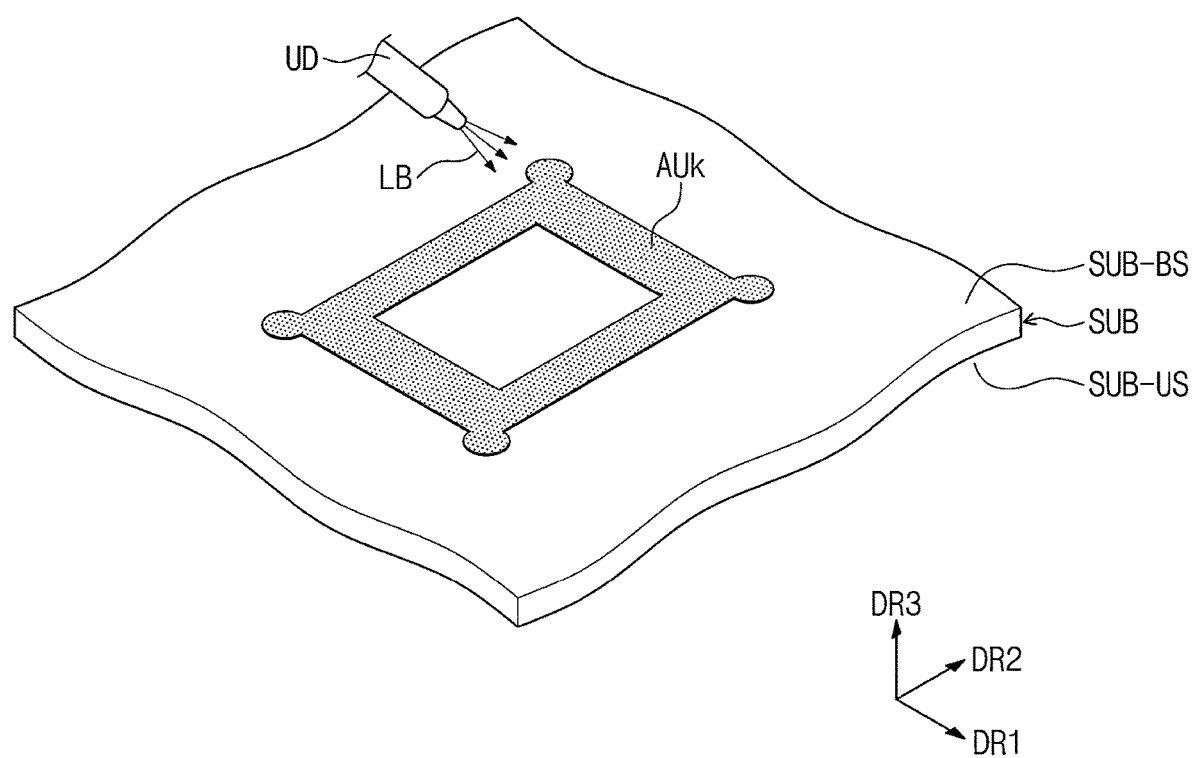

FIGS. 11A and 11B are perspective views illustrating a method for manufacturing a display device, according to another exemplary embodiment of the invention.

A process of applying an adhesive member AUk onto the rear surface SUB-BS of the substrate SUB in a method for manufacturing a display device in FIGS. 11A and 11B may be different from that in the method for manufacturing the display device in FIGS. 9A to 9D. The other processes of the manufacturing method in FIGS. 11A and 11B may be substantially the same as corresponding processes of the manufacturing method in FIGS. 9A to 9D.

According to an exemplary embodiment of the invention, the adhesive member AUk of FIGS. 11A and 11B may have a shape when the first and second adhesive members ADm and ADa of FIG. 6 constitute a single unitary body.

In detail, referring to FIG. 11A, an applying apparatus NDk may apply the adhesive member AUk onto the rear surface SUB-BS of the substrate SUB. The applying apparatus NDk may apply the adhesive member AUk onto the rear surface SUB-BS in such a way that the shape of the adhesive member AUk corresponds to the merged shape of the shapes of the first and second adhesive members ADm and ADa illustrated in FIGS. 9A and 9C. In other words, the adhesive member AUk may be applied onto the rear surface SUB-BS by one applying apparatus NDk.

According to an exemplary embodiment of the invention, the adhesive member AUk may include the thermal initiator and the photoinitiator. In other words, the feature of the adhesive member AUk of FIG. 11A may correspond to a feature in which each of the first and second adhesive members ADm and ADa of FIG. 6 includes both the thermal initiator and the photoinitiator.

As illustrated in FIG. 11B, since the photoinitiator is included in the adhesive member AUk, UV light LB may be irradiated to the adhesive member AUk by a light apparatus UD. Thus, the adhesive member AUk may be firmly fixed to the rear surface SUB-BS. Thereafter, even though not shown in the drawings, the sensor unit SU of FIG. 6 may be disposed on the adhesive member AUk, and external heat may be provided to the adhesive member AUk to fix the sensor unit SU to the adhesive member AUk.

Figure 12A:
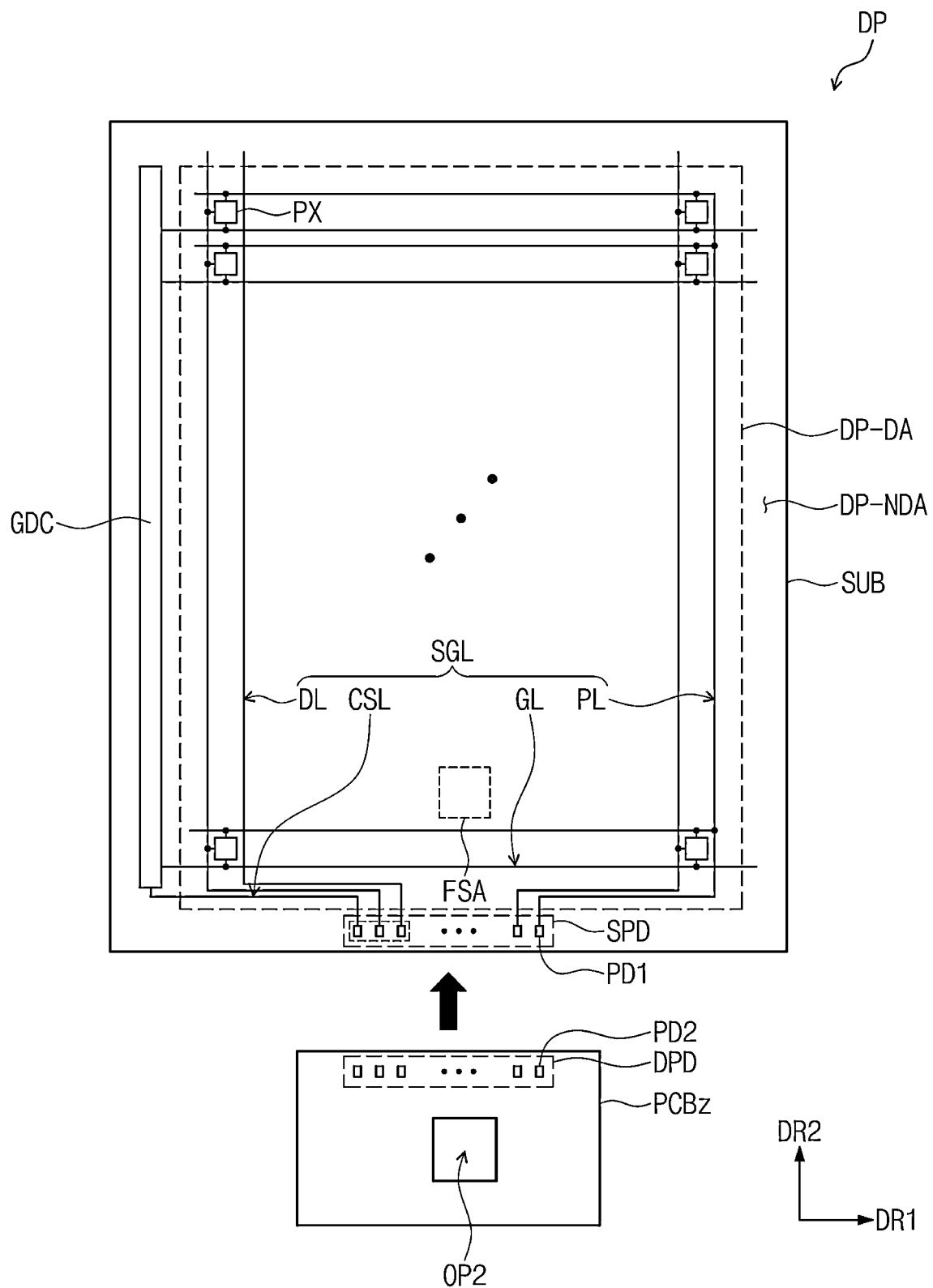
FIG. 12A is a plan view illustrating another exemplary embodiment of a circuit board and a display panel according to the invention.
Figure 12B:
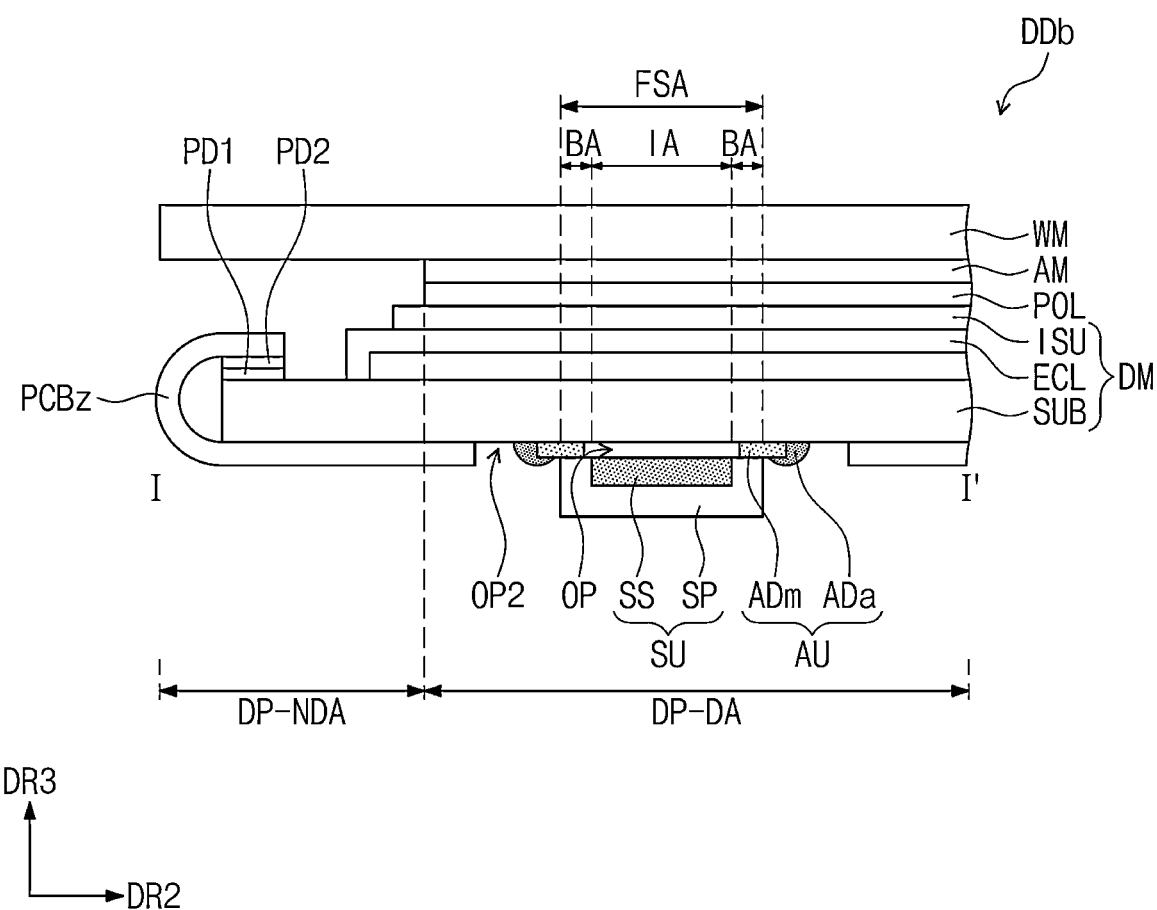
FIG. 12B is a cross-sectional view illustrating a display device including the circuit board and the display panel of FIG. 12A.
Figure 12C:
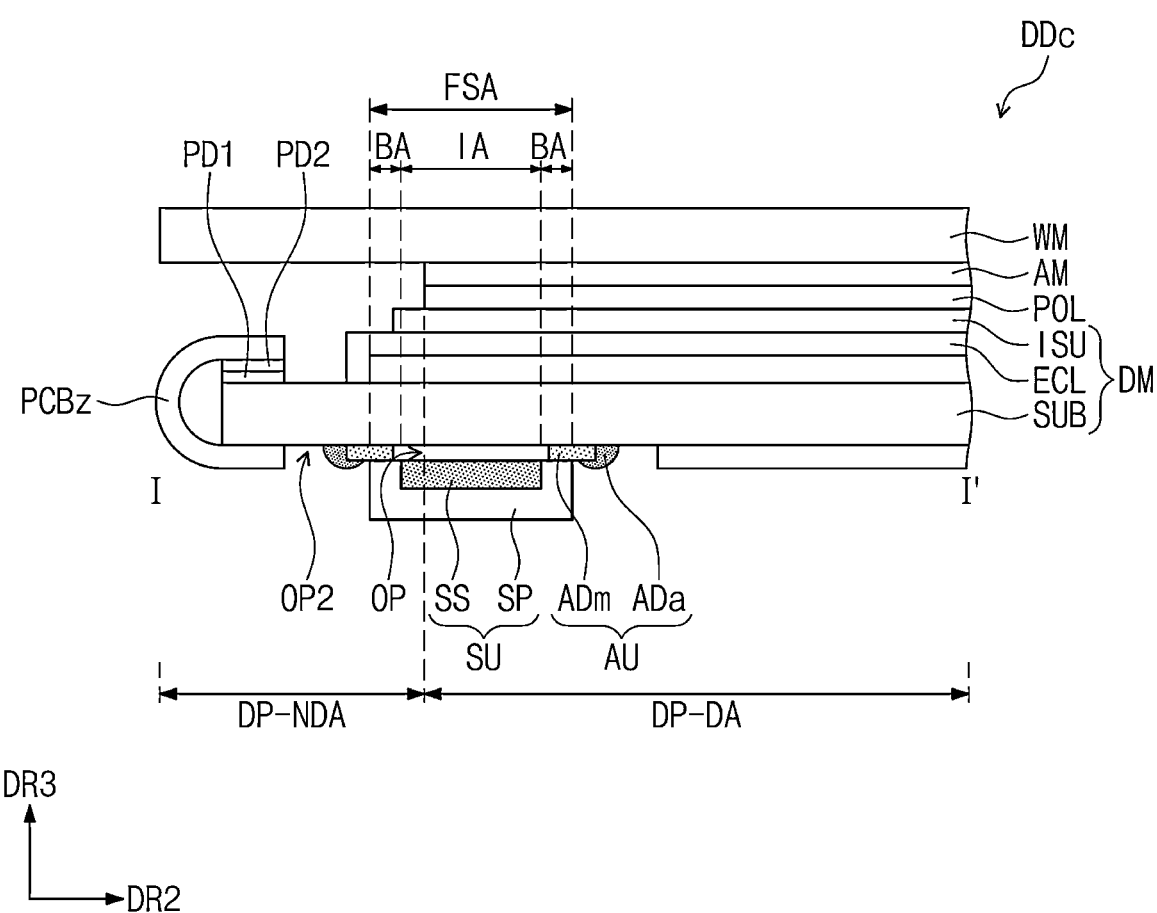
FIG. 12C is a cross-sectional view illustrating a display device including a modified example of the circuit board and the display panel of FIG. 12A.

FIG. 12A is a plan view illustrating a circuit board and a display panel according to another exemplary embodiment of the invention. FIG. 12B is a cross-sectional view illustrating a display device including the circuit board and the display panel of FIG. 12A. FIG. 12C is a cross-sectional view illustrating a display device including a modified example of the circuit board and the display panel of FIG. 12A.

A structure of a circuit board PCBz and a position of the sensor unit SU in a display device DDb of FIGS. 12A and 12B may be different from those in the display device DD of FIGS. 4 and 6, and the other components of the display device DDb may be substantially the same as corresponding components of the display device DD.

Referring to FIGS. 12A and 12B, a hole area OP2 may be defined in the circuit board PCBz according to an exemplary embodiment of the invention. The second bonding area DPD of the circuit board PCBz may be disposed on the first bonding area SPD, and the circuit board PCBz may be bent along one side surface of the substrate SUB. Since the circuit board PCBz is bent along the one side surface of the substrate SUB, a portion of the circuit board PCBz may be disposed on the rear surface of the substrate SUB. In this case, the portion of the circuit board PCBz disposed on the rear surface of the substrate SUB may overlap the bezel area DP-NDA and the display area DP-DA. In particular, the hole area OP2 of the circuit board PCBz may overlap the sensing area FSA.

The sensor unit SU may be inserted in the hole area OP2 and may be disposed on the rear surface of the substrate SUB. The sensor unit SU may be electrically connected to the circuit board PCBz.

The adhesive member AU according to an exemplary embodiment of the invention may be directly disposed on (e.g., adhered to) the sensor unit SU and the substrate SUB to fix the sensor unit SU to the substrate SUB.

Referring to FIG. 12C, a position of the sensor unit SU in a display device DDc of FIG. 12C may be different from that in the display device DDb of FIG. 12B, and the other components of the display device DDc may be substantially the same as corresponding components of the display device DDb.

According to an exemplary embodiment of the invention, a hole area OP2 of FIG. 12C may overlap the display area DP-DA and the bezel area DP-NDA. Thus, the sensor unit SU of FIG. 12C may also overlap the display area DP-DA and the bezel area DP-NDA.

Figure 13A:
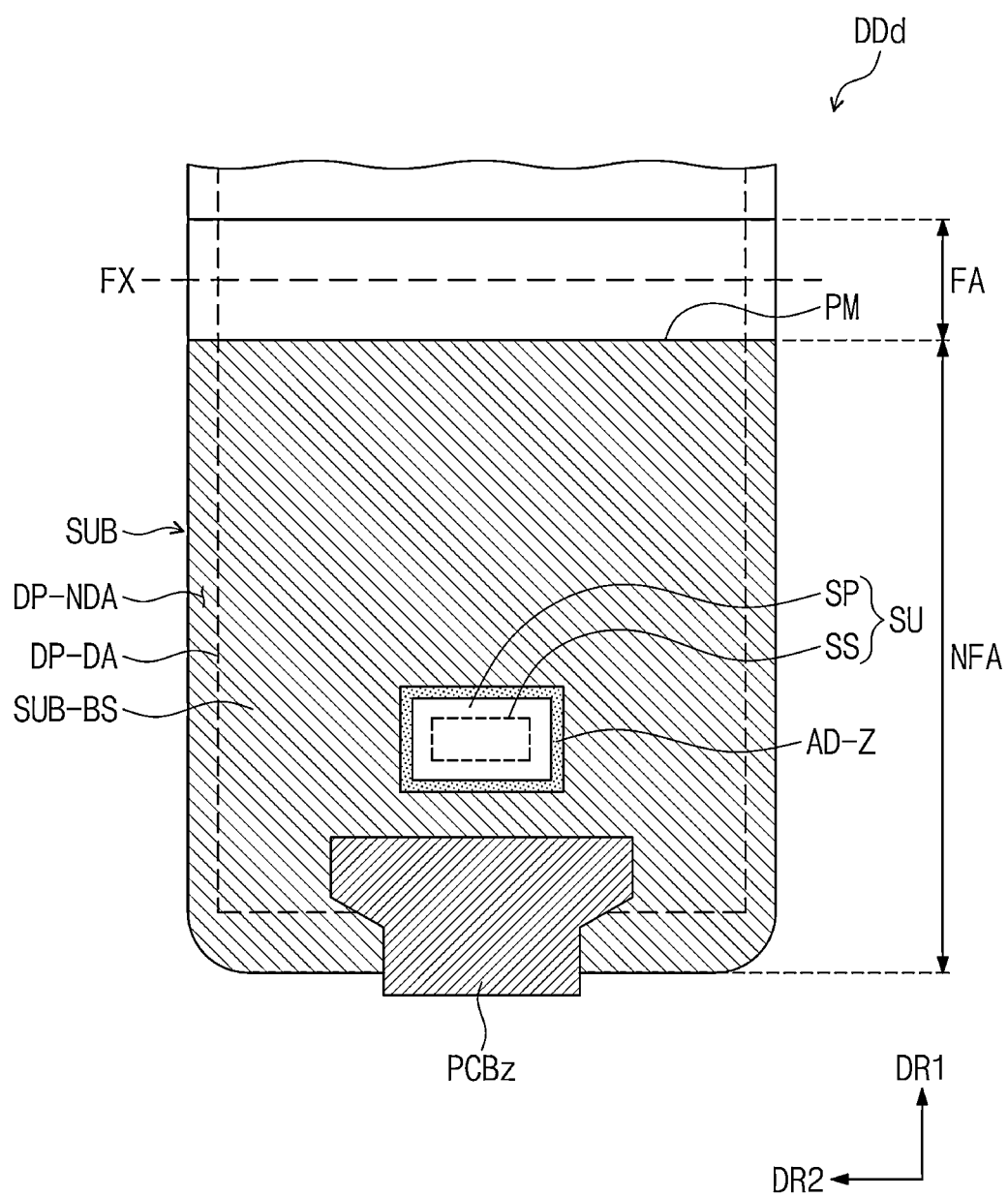
FIG. 13A is a plan view illustrating another exemplary embodiment of a rear surface of a display device according to the invention.

FIG. 13A is a plan view illustrating a rear surface of a display device according to yet another exemplary embodiment of the invention. FIG. 13B is a cross-sectional view illustrating the display device of FIG. 13A.

A display device DDd of FIGS. 13A and 13B may further include a protective member PM as compared with the display device DD of FIG. 6. In addition, an adhesive member AD-Z of the display device DDd may be different from the adhesive member AU of the display device DD. The other components of the display device DDd of FIGS. 13A and 13B may be substantially the same as corresponding components of the display device DD of FIG. 6.

According to an exemplary embodiment of the invention, the display device DDd may be a flexible display device. In other words, the display device DDd may include a folding area FA and a non-folding area NFA adjacent to the folding area FA, and the folding area FA may be bendable or foldable along a folding axis FX.

In detail, referring to FIGS. 13A and 13B, the protective member PM may be disposed on the rear surface of the substrate SUB. In particular, the protective member PM may be disposed on the rear surface of the substrate SUB to overlap the non-folding area NFA overlapping the sensor unit SU.

The adhesive member AD-Z and the circuit board PCBz may be disposed on the protective member PM. The adhesive member AD-Z may adhere the sensor unit SU to the protective member PM. In an exemplary embodiment, the adhesive member AD-Z may have the same composition as that of the adhesive member AU illustrated in FIG. 6, for example. In an exemplary embodiment, the adhesive member AD-Z may be provided in the form of a double-sided adhesive tape, for example.

The adhesive member AD-Z illustrated in FIG. 13B may be in the form of the double-sided adhesive tape. In this case, the adhesive member AD-Z may not include the thermal initiator and the photoinitiator and may adhere the sensor unit SU to the protective member PM.

According to the exemplary embodiments of the invention, the sensor unit may be disposed on the first adhesive member including the thermal initiator, and the first adhesive member may be fixed to the rear surface of the substrate by the second adhesive member including the photoinitiator. In particular, since the first adhesive member and the substrate are fixed to each other by the second adhesive member, the alignment between the first adhesive member and the substrate may be maintained when the substrate is moved into the chamber.

While the invention have been described with reference to exemplary embodiments, it will be apparent to those skilled in the art that various changes and modifications may be made without departing from the spirits and scopes of the invention. Therefore, it should be understood that the above exemplary embodiments are not limiting, but illustrative. Thus, the scopes of the invention are to be determined by the broadest permissible interpretation of the following claims and their equivalents, and shall not be restricted or limited by the foregoing description.

What is claimed is:

1. A display device comprising:
   a display module;
   a first adhesive member including a first surface directly disposed on a rear surface of the display module;
   a sensor unit directly disposed on a second surface of the first adhesive member which is opposite to the first surface of the first adhesive member; and
   a second adhesive member directly disposed on at least a portion of the second surface of the first adhesive member and the rear surface of the display module,
   wherein, in a plan view, the second adhesive member is spaced apart from the sensor unit, and
   wherein only a portion of the sensor unit overlaps the first adhesive member.

2. The display device of claim 1, wherein the first adhesive member includes a first thermal initiator and the second adhesive member includes a first photoinitiator which is different from the first thermal initiator of the first adhesive member and,
   the first thermal initiator is activated by a change in temperature, and the first photoinitiator is activated by ultraviolet light.

3. The display device of claim 2, wherein the first adhesive member and the second adhesive member constitute a single unitary body on the rear surface of the display module,
   wherein the first adhesive member further includes a second photoinitiator, and the second adhesive member further includes a second thermal initiator.

4. The display device of claim 1, wherein the display module includes: a display area in which an image is displayed; and a bezel area adjacent to the display area, and wherein the sensor unit overlaps the display area.

5. The display device of claim 1, wherein an opening overlapping the sensor unit is defined in the first adhesive member, and the sensor unit is surrounded by the first adhesive member in a plan view.

6. The display device of claim 5, wherein the sensor unit is spaced apart from the rear surface of the display module by the first adhesive member.

7. The display device of claim 5, wherein
the sensor unit comprises:
a sensor overlapping the opening; and
a package in which the sensor is disposed, and
wherein the package is directly disposed on the first adhesive member.

8. The display device of claim 5, wherein the sensor unit includes an optical type fingerprint recognition sensor.

9. The display device of claim 1, wherein the first adhesive member overlaps an entirety of the sensor unit except for a sensor and is directly disposed on the rear surface of the display module and the sensor unit.

10. The display device of claim 9, wherein the sensor unit includes an ultrasonic type fingerprint recognition sensor.

11. The display device of claim 1, further comprising:
a circuit board electrically connected to the display module and disposed on the rear surface of the display module,
wherein a hole area is defined in the circuit board; and the sensor unit is inserted in the hole area and is directly disposed on the first adhesive member.

12. The display device of claim 1, wherein the display module comprises:
a substrate;
a display element layer disposed on the substrate;
an encapsulation member disposed on the display element layer; and
an input sensing unit disposed on the encapsulation member,
wherein the first adhesive member and the second adhesive member are disposed on a rear surface of the substrate, which corresponds to the rear surface of the display module.

13. A display device comprising:
a display module including:
a display area in which an image is displayed; and
a bezel area adjacent to the display area;
a protective member overlapping a portion of the display area and disposed on a rear surface of the display module;
a sensor unit overlapping the portion of the display area and disposed on the protective member; and
an adhesive member overlapping the sensor unit and adhering the sensor unit to the protective member,
wherein, in a plan view, the adhesive member is spaced apart from a sensor of the sensor unit, and
wherein only a portion less than an entire portion of the adhesive member is overlapped by the sensor unit.

14. The display device of claim 13, wherein a folding area and a non-folding area adjacent to the folding area are defined in the display module, and the non-folding area overlaps the sensor unit, and
wherein the protective member overlaps the non-folding area.

15. A method for manufacturing a display device, the method comprising:
applying a first surface of a first adhesive member onto a rear surface of a substrate in which a display area and a bezel area adjacent to the display area are defined;
disposing a sensor unit on a second surface of the first adhesive member which is opposite to the first surface of the first adhesive member;
applying a second adhesive member onto at least a portion of the second surface of the first adhesive member and the rear surface of the substrate;
irradiating ultraviolet light to the second adhesive member; and
providing external heat to the first adhesive member,
wherein, in a plan view, the second adhesive member is spaced apart from the sensor unit, and
wherein only a portion of the sensor unit overlaps the first adhesive member.

16. The method of claim 15, wherein the first adhesive member includes a thermal initiator and is applied onto the rear surface of the substrate by a first applying apparatus to overlap the display area, and
wherein the second adhesive member includes a photoinitiator and is applied onto the rear surface of the substrate by a second applying apparatus to overlap the display area.

17. The method of claim 15, wherein the first adhesive member and the second adhesive member are applied onto the rear surface of the substrate by a single applying apparatus, and
wherein the first adhesive member includes a first thermal initiator and a first photoinitiator and the second adhesive member includes a second thermal initiator and a second photoinitiator.

18. The method of claim 15, wherein the applying the second adhesive member and the irradiating the ultraviolet light are performed at a same time.

19. The method of claim 18, wherein the first adhesive member is applied such that an entirety of the sensor unit except for a sensing area of a sensor overlaps the first adhesive member in the plan view.

20. The method of claim 15, wherein the first adhesive member is applied such that the sensor unit except for a sensing area of a sensor is surrounded by the first adhesive member in the plan view.

* * * * *